(12) United States Patent
Minato

(10) Patent No.: US 7,739,458 B2
(45) Date of Patent: Jun. 15, 2010

(54) IMAGE FORMING APPARATUS, SHARED DATA MANAGEMENT METHOD AND SHARED DATA MANAGEMENT SYSTEM

(75) Inventor: Junichi Minato, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 1855 days.

(21) Appl. No.: 10/658,273

(22) Filed: Sep. 10, 2003

(65) Prior Publication Data

US 2004/0111462 A1    Jun. 10, 2004

(30) Foreign Application Priority Data

Sep. 20, 2002   (JP)  ............... 2002-275979
Sep. 20, 2002   (JP)  ............... 2002-275980
Aug. 20, 2003   (JP)  ............... 2003-296580

(51) Int. Cl.
G06F 12/00    (2006.01)
G06F 13/00    (2006.01)
G06F 13/28    (2006.01)
G06F 13/18    (2006.01)
G06F 15/167   (2006.01)
G06F 12/02    (2006.01)
G09G 5/39     (2006.01)

(52) U.S. Cl. ............... 711/152; 711/147; 711/148; 711/149; 711/150; 711/151; 711/153; 711/163; 345/531; 345/535; 345/541; 345/543

(58) Field of Classification Search ......... 711/147–153, 711/163; 345/531, 535, 541, 543
See application file for complete search history.

(56) References Cited

U.S. PATENT DOCUMENTS 5,245,702 A * 9/1993 McIntyre et al. ............ 345/541
5,528,361 A * 6/1996 Sakata ..................... 358/296
6,912,621 B2 * 6/2005 Harris ..................... 711/112
6,965,893 B1 * 11/2005 Chan et al. .................. 707/8

FOREIGN PATENT DOCUMENTS

JP  9-269912    10/1997
JP  10-134010   5/1998
JP  2002-84383  3/2002

OTHER PUBLICATIONS

U.S. Appl. No. 10/849,812, filed May 21, 2004, Minato.
U.S. Appl. No. 11/133,356, filed May 20, 2005, Minato.
U.S. Appl. No. 09/814,705, filed Mar. 23, 2001, Minato.

* cited by examiner

Primary Examiner—Sanjiv Shah
Assistant Examiner—Yaima Campos
(74) Attorney, Agent, or Firm—Oblon, Spivak, McClelland, Maier & Neustadt, L.L.P.

(57) ABSTRACT

An image forming apparatus includes a plurality of hardware resources provided to carry out image formation. A plurality of application programs perform respective processing of the plurality of hardware resources related to the image formation. A storage device stores rewritable shared data which is used by the application programs in common. A shared-data control unit suspends one of a write-lock request or a read-lock request that is received from one of the application programs when acquisition and/or updating of the shared data is inhibited, and after the acquisition and/or updating of the shared data is allowed, inhibits the acquisition and/or updating of the shared data by other application programs in accordance with the suspended request for the one of the plurality of application programs.

10 Claims, 26 Drawing Sheets

| | NO. OF ENTRY ID | TITLE | USER CODE | E-MAIL ADDRESS | FACSIMILE | GROUP DATA | RELAY DATA | AUTHENTICATE | CHANGE ORDER |
|---|---|---|---|---|---|---|---|---|---|
| COPY | 100 | A, B, C, D, ... | 12345678 | | | | | | NO |
| COPY + FAX | 710 | A, B, C, D, ... | 12345678 | | 03-1234-5678 | MEMBER ID LIST: 1,5,9... | #10 | | YES |
| COPY + FAX + SCANNER | 2110 | A, B, C, D, ... | 12345678 | address@ricoh.co.jp | 03-1234-5678 | | #10 | PASSWORD | YES |
| COPY + SCANNER | 2100 | A, B, C, D, ... | 12345678 | address@ricoh.co.jp | | | | PASSWORD | YES |

FIG. 4

IMAGE FORMING APPARATUS, SHARED DATA MANAGEMENT METHOD AND SHARED DATA MANAGEMENT SYSTEM

BACKGROUND OF THE INVENTION

1. Field of the Invention

The present invention relates to an image forming apparatus, a shared data management method and a shared data management system, and more specifically to an image forming apparatus, a shared data management method and a shared data management system which manages rewritable shared data.

2. Description of the Related Art

In recent years, the image forming apparatus in which the respective functions of the printer, the copier, the facsimile and the scanner are installed in the same housing has come to be known. Hereinafter, the image forming apparatus of this type will be called the multi-function system.

In the multi-function system, at least four kinds of software respectively corresponding to the printer, the copy, the facsimile and the scanner are provided in addition to the display unit, the printing unit and the imaging unit in the same housing, and one of the printer, the copy, the facsimile and the scanner which is selected from among those kinds of software is operated.

For example, Japanese Laid-Open Patent Application No. 2002-84383 discloses an example of the image forming apparatus of the above type.

In such a multi-function system, unitary management of the destination address data used as user information with the copy, the scanner, etc., such as the electronic e-mail address and the facsimile number, is carried out.

The user information for which the unitary management is carried out by the multi-function system is suitably updated according to the input commands from the operator who operates the multi-function system. Moreover, the multi-function system is connected to a network device through a network, and the user information is suitably updated according to the input commands from the network device.

Since the user information for which the unitary management is carried out by the multi-function system is updated in response to the requests from one or more operators who operate the multi-function system or the network device, there has been the possibility that the user information is simultaneously updated from two or more operators.

Moreover, when the user information is used by the software corresponding to the copy, the scanner, etc., there has been the possibility that the user information is updated by the operator who operates the multi-function system or the network device.

Furthermore, there has been the possibility that the user information is used by the software corresponding to the copier or scanner function when it is updated by the operator who operates the multi-function system or the network device.

To avoid the problems, the conventional multi-function system carries out the exclusion of an acquisition request of the user information from the software corresponding to the copier or scanner function and the exclusion of an updating request of the user information from another operator when the user information is being updated by one operator.

Moreover, the conventional multi-function system carries out the exclusion of an updating request of the user information from the operator when the user information is being used by the software corresponding to the copier or scanner function.

However, when the exclusion of the updating or acquisition request of the user information is carried out, the conventional multi-function system is placed in a waiting state until the previously received updating or acquisition request of the user information is completed, and re-starts the processing of the updating or acquisition request that is subjected to the exclusion.

Therefore, if the exclusion of the updating or acquisition requests of the user information is repeatedly and continuously carried out, the conventional multi-function system has the problem that it cannot complete the updating or acquisition requests of the user information for a long period of time.

In addition, the conventional multi-function system has the problem that many updating or acquisition requests of the user information are likely to occur and the resources of the multi-function system are wasted vainly when the exclusion of the updating or acquisition requests of the user information is carried out continuously.

Moreover, when the end of the updating of the user information is notified to the conventional multi-function system from the operator who operates the multi-function system or the network device, it will notify the updating end of the user information to all the software that may use the user information.

The software to which the updating end of the user information is notified will perform the read-out request of the user information and the acquisition of the updated user information, if needed.

However, not all the software to which the updating end of the user information is notified is necessarily needed to acquire the updated user information immediately after the updating end. Therefore, it is unnecessary to notify the updating end of the user information to all the software that may use the user information, and the resources of the multi-function system in such a case are wasted vainly. Therefore, the conventional image forming apparatus still has the problem in that the efficiency of the management of the shared data is low.

SUMMARY OF THE INVENTION

An object of the present invention is to provide an improved image forming apparatus in which the above-described problems are eliminated.

Another object of the present invention is to provide an image forming apparatus which can efficiently perform the management of shared data, including processing of the updating request and acquisition request of user information, without wasting the resources of the image forming apparatus.

Another object of the present invention is to provide a shared data management method which can efficiently perform the management of shared data, including processing of the updating request and acquisition request of user information, without wasting the resources of a multi-function system.

Another object of the present invention is to provide a shared data management system which can efficiently perform the management of shared data, including processing of the updating request and acquisition request of user information, without wasting the resources of a multi-function system.

The above-mentioned objects of the present invention are achieved by an image forming apparatus comprising: a plurality of hardware resources provided to carry out image formation; a plurality of application programs performing respective processing of the plurality of hardware resources related to the image formation; a storage device storing rewritable shared data which is used by the plurality of application programs in common; and a shared-data control unit suspending one of a write-lock request or a read-lock request that is received from one of the plurality of application programs when acquisition and/or updating of the shared data is inhibited, and after the acquisition and/or updating of the shared data is allowed the shared-data control unit inhibiting the acquisition and/or updating of the shared data by other application programs than the one of the plurality of application programs in accordance with the suspended one of the write-lock request or the read-lock request for the one of the plurality of application programs.

The above-mentioned objects of the present invention are achieved by an image forming apparatus comprising: a plurality of hardware resources provided to carry out image formation; a plurality of application programs performing respective processing of the plurality of application programs related to the image formation; a storage device storing rewritable shared data which is used by the plurality of application programs in common; and a shared-data control unit selecting any of the plurality of application programs as destinations of updating-start notification and notifying a start of updating of the shared data to the selected application programs when acquisition and updating of the shared data is inhibited in response to a write-lock request received from one of the plurality of application programs, and the shared-data control unit notifying an end of the updating of the shared data to the selected application programs when the acquisition and updating of the shared data is allowed in response to an unlock request received from the one of the plurality of application programs.

The above-mentioned objects of the present invention are achieved by an image forming apparatus comprising: a plurality of hardware resources provided to carry out image formation; a plurality of application programs performing respective processing of the plurality of hardware resources related to the image formation; a storage device storing rewritable shared data which is used by the plurality of application programs in common; and a shared-data control unit inhibiting, prior to receiving inputs of an operator into one of the plurality of application programs, acquisition and updating of the shared data by other application programs than the one of the plurality of application programs, and notifying a start of updating of the shared data by the one of the plurality of application programs to the plurality of application programs, and the shared-data control unit allowing the acquisition and updating of the shared data in response to an unlock request received from the one of the plurality of application programs, and notifying an end of the updating of the shared data by the one of the plurality of application programs to the plurality of application programs.

According to the present invention, it is possible for the image forming apparatus, the shared data management method and the shared data management system of the present invention to remarkably improve the efficiency of the shared data management, including the processing of the updating request and acquisition request of the shared data. The image forming apparatus, the shared data management method and the shared data management system of the present invention do not waste the resources of the multi-function system by avoiding that the updating request and acquisition request of the shared data are sent vainly.

Moreover, according to the present invention, the program which will notify the start and end of the updating of the shared data is chosen and the notification of the selected program is performed. Useless notice processing can be decreased, and the image forming apparatus, the shared data management method and the shared data management system of the present invention can carry out the management of the shared data without wasting the resources of the multi-function system.

The updating request and acquisition request of the shared data can be performed efficiently, useless notice processing can be decreased, and the image forming apparatus, the shared data management method, and shared data management system which can manage rewritable shared data can be offered, without wasting the resource of the multi-function system.

BRIEF DESCRIPTION OF THE DRAWINGS

Other objects, features and advantages of the present invention will be apparent from the following detailed description when read in conjunction with the accompanying drawings.

FIG. 4 is a diagram of an example of user information.

DETAILED DESCRIPTION OF PREFERRED EMBODIMENTS

A description will now be provided of the preferred embodiments of the present invention with reference to the accompanying drawings.

Figure 1:
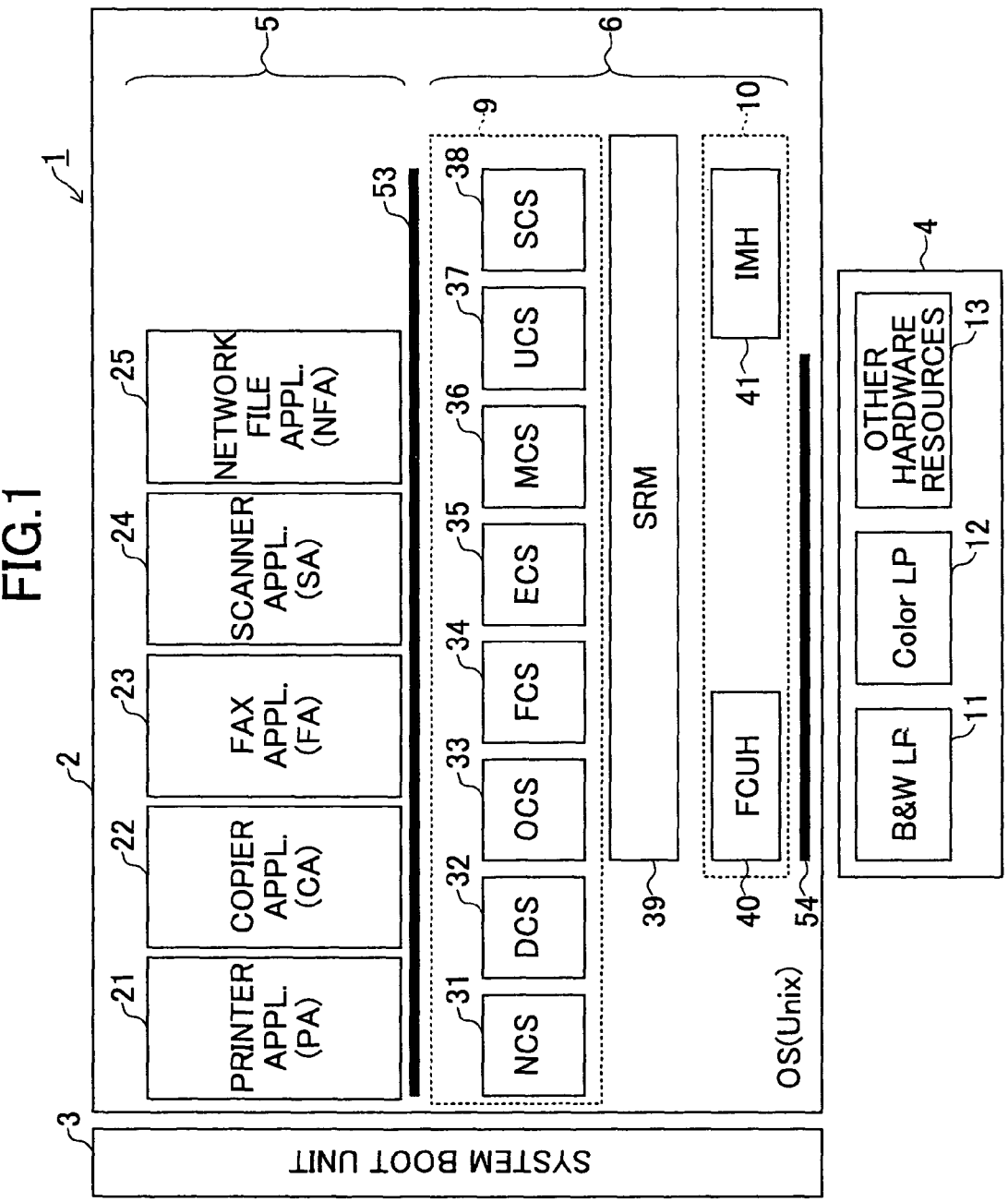
FIG. 1 is a block diagram of one preferred embodiment of a multi-function system according to the present invention.

FIG. 1 shows one preferred embodiment of the multi-function system according to the present invention.

As shown in FIG. 1, the multi-function system 1 comprises the software group 2, the system boot unit 3, and the hardware resources 4.

When the power switch (not shown) of the multi-function system 1 is turned ON, the system boot unit 3 is caused to start execution of the application layer 5 and the platform layer 6.

For example, the system boot unit 3 reads the programs of the application layer 5 and the platform layer 6 from the hard disk drive (HDD), which corresponds to the external storage device. Then the system boot unit 3 transfers the read programs to the memory areas, and starts executions of the programs.

The hardware resources 4 include the monochrome laser printer (B&W LP) 11, the color laser printer (Color LP) 12, and the other hardware resources 13 such as the scanner, the fax, etc.

The software group 2 includes the application layer 5 and the platform layer 6 which are operated on the operating system (OS), such as UNIX (registered trademark). The application layer 5 includes the programs which perform respective processings specific to the user services related to the image formation, such as the printer, the copy, the facsimile, and the scanner.

The application layer 5 includes the printer application (PA) 21 which is the application program for the printer, the copy application (CA) 22 which is the application program for the copier, the facsimile application (FA) 23 which is the application program for the facsimile, the scanner application (SA) 24 which is the application program for the scanner, and the network file application (NFA) 25 which is the application program for the network file. The network file application 25 is provided to manage the data communications between the multi-function system 1 and the network device which is connected to the system 1 through the network.

Moreover, the platform layer 6 includes the control service layer 9 which interprets the processing request from the application layer 5 and generates the acquisition request of hardware resources 4, the system resource manager (SRM) 39 which manages one or more hardware resources 4 and arbitrates the acquisition request from the control service layer 9, and the handler layer 10 which manages the hardware resources 4 according to the acquisition request from SRM 39.

The control service layer 9 includes one or more service modules which may include the network control service (NCS) 31, the delivery control service (DCS) 32, the operation panel control service (OCS) 33, the facsimile control service (FCS) 34, the engine control service (ECS) 35, the memory-control service (MCS) 36, the user information control service (UCS) 37, and the system control service (SCS) 38.

In addition, the platform layer 6 is provided to have the API 53 which makes it possible to receive the processing request from the application layer 5 according to a pre-defined function.

The OS carries out parallel execution of each software of the application layer 5 and the platform layer 6 as a process.

The process of NCS 31 offers the service which can be used in common to the application which needs network I/O, distributes the data received by each protocol from the network side to each application, or performs agency at the time of transmitting the data from each application to the network side.

For example, NCS 31 controls the data communication with a network device connected through the network, by using the HTTP (hypertext transfer protocol) according to the HTTPD (hypertext transfer protocol daemon).

The process of DCS 32 controls distribution of the accumulated documents etc.

The process of OCS 33 controls the operation panel which is the interface between the operator and the multi-function system 1 used as the unit of communication of information.

The process of FCS 34 provides the application API for performing the facsimile transmission and reception through the PSTN or ISDN network used by the application layer 5, the registration/access of the various facsimile data managed by the memory for backup, the facsimile reading, the facsimile reception printing, etc.

The process of ECS 35 controls the engine units, such as the monochrome laser printer 11, the color laser printer 12, and the other hardware resources 13.

The process of MCS 36 performs the memory control of the acquisition and releasing of the HDD 78 retaining document data and image data, the compression and decompression of the image data, etc.

The process of UCS 37 manages the user information.

The process of SCS 38 processes the application management, the operation panel control, the system screen display, the LED display, the hardware-resources management, the interruption application control, etc.

The process of SRM 39 performs control of the system and management of the hardware resources 4 in association with SCS 38.

For example, according to the acquisition request using the hardware resources 4 from the high order layer, the process of SRM 39 arbitrates the request and carries out the execution control.

Specifically, the process of SRM 39 determines whether the hardware resources 4 to which the acquisition request is sent can be used (or whether the hardware resources 4 are already used by another acquisition request). If the use of the hardware resources 2 is possible, the process of SRM 39 will notify to the high order layer that the hardware resources 4 to which the acquisition request is sent can be used.

Moreover, the process of SRM 39 performs the scheduling of the acquisition request from the high order layer for using the hardware resources 4, and carries out the contents of the request (for example, paper conveyance with the printer engine, imaging operation, memory reservation, file generating, etc.) directly.

Moreover, the handler layer 10 includes the facsimile control-unit handler (FCUH) 40 which manages the facsimile control unit (FCU), and the image memory handler (IMH) 41 which manages the assignment of the memory to the process and the memory assigned to the process.

SRM 39 and FCUH 40 send the processing request to the hardware resources 4 using the engine I/F 54 which makes it possible to send the processing request to the hardware resources 4 according to the pre-defined function.

The multi-function system 1 can process the common processing, shared by the respective applications, in the platform layer 6 in a concentrated manner.

Next, a description will be given of the hardware composition of the multi-function system 1.

Figure 2:
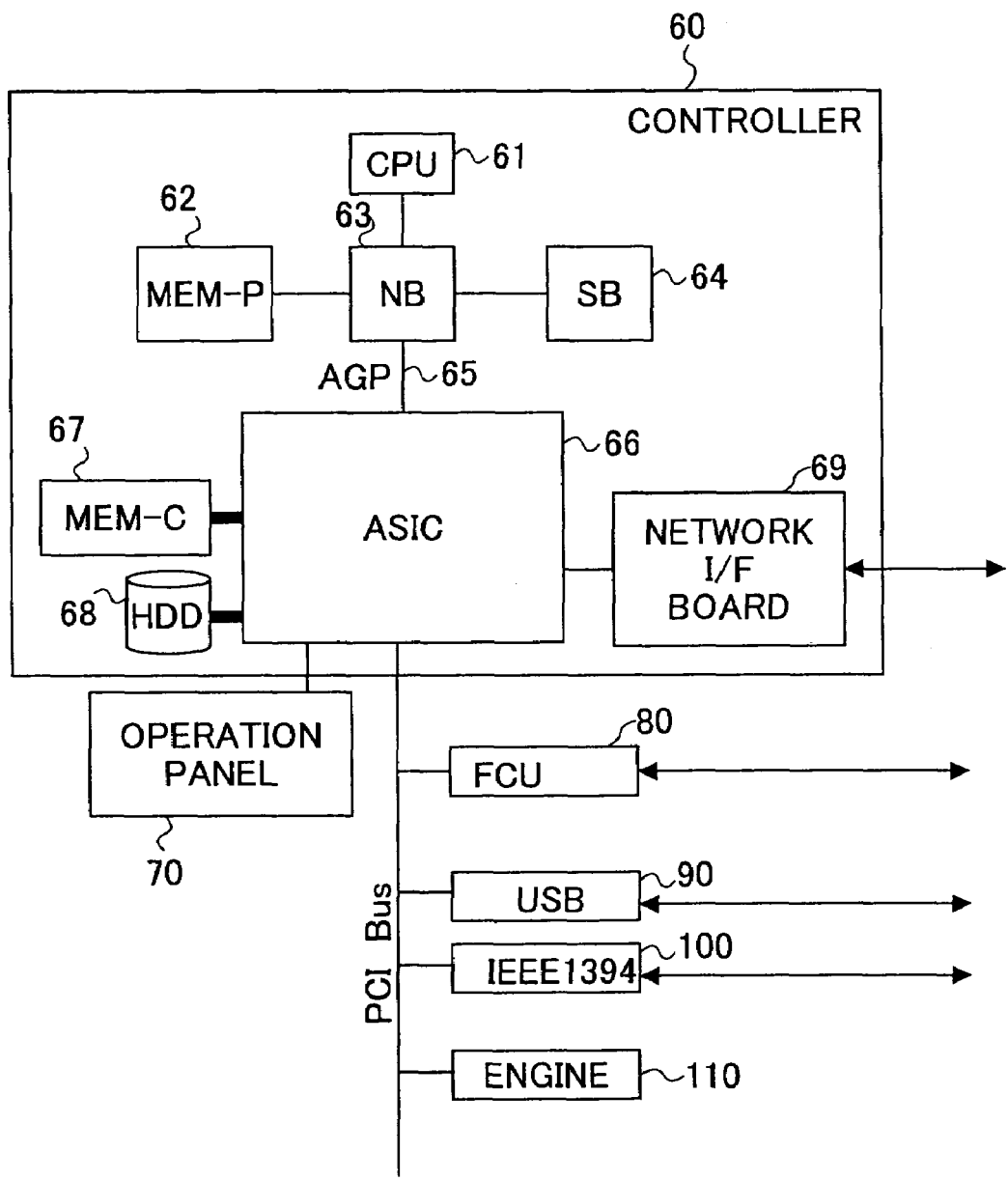
FIG. 2 is a block diagram of the hardware composition of the multi-function system of the present embodiment.

FIG. 2 shows the hardware composition of one preferred embodiment of the multi-function system 1 according to the present invention.

The multi-function system 1 includes the controller board 60, the operation panel 70, the FCU 80, the USB device 90, the IEEE1394 device 100, and the engine 110.

The controller board 60 includes the CPU 61, the ASIC 66, HDD 68, the system memory (MEM-P) 62, the local memory (MEM-C) 67, the north bridge (NB) 63, the south bridge (SB) 64, and the network interface board 69.

The operation panel 70 is connected to ASIC 66 of the controller board 60.

Moreover, the FCU 80, the USB device 90, the IEEE1394 device 100 and the engine 110 are connected to ASIC 66 of the controller board 60 by the PCI (peripheral component interconnect) bus.

In the controller board 60, the local memory 67, the HDD 68, and the network interface board 69 are connected to ASIC 66, and CPU 61 and ASIC 66 are connected to ASIC 66 through the NB 63 which is the CPU chip set.

Thus, if CPU 61 and ASIC 66 are connected through the NB 63, when the interface of CPU 61 is not exhibited, it can resolve the problem.

Moreover, ASIC 66 and NB 63 are connected through AGP (accelerated graphics port) 65, not through the PCI bus. In order to carry out execution control of one or more processes which constitute the application layer 5 and the platform layer 6 of FIG. 1, ASIC 66 and NB 63 are connected not through the low-speed PCI bus but through AGP 65. It is thus possible to prevent the lowering of the performance.

CPU 61 performs the control of the whole multi-function system 1. CPU 61 starts execution of NCS 31, DCS 32, OCS 33, FCS 34, ECS 35, MCS 36, UCS 37, SCS 38, SRM 39, FCUH 40, and IMH 41 as a process, and performs the execution of each process on the OS. Moreover, CPU 61 starts execution of the printer application 21, the copy application 22, the facsimile application 23, the scanner application 24 and the network file application 25 which constitute the application layer 5.

NB 63 is the bridge which is provided for connecting CPU 61, the system memory 62, SB 64 and ASIC 66.

The system memory 62 is a memory used for image drawing of the multi-function system 1.

SB 64 is the bridge which is provided for connecting NB 63 and ROM, and the PCI bus and the peripheral devices.

Moreover, the local memory 67 is the memory used as the image buffer for the copying, and the encoding buffer.

ASIC 66 is an application-specific integrated circuit for image-processing uses including the hardware for image processing.

HDD 68 is the storage device for performing accumulation of images, accumulation of document data, accumulation of programs, accumulation of font data, accumulation of forms, etc.

The operation panel 70 is provided to display the operational messages to the operator and receive the input operational commands from the operator.

A description will be given of the shared data management method which is carried out by the multi-function system 1.

Figure 3:
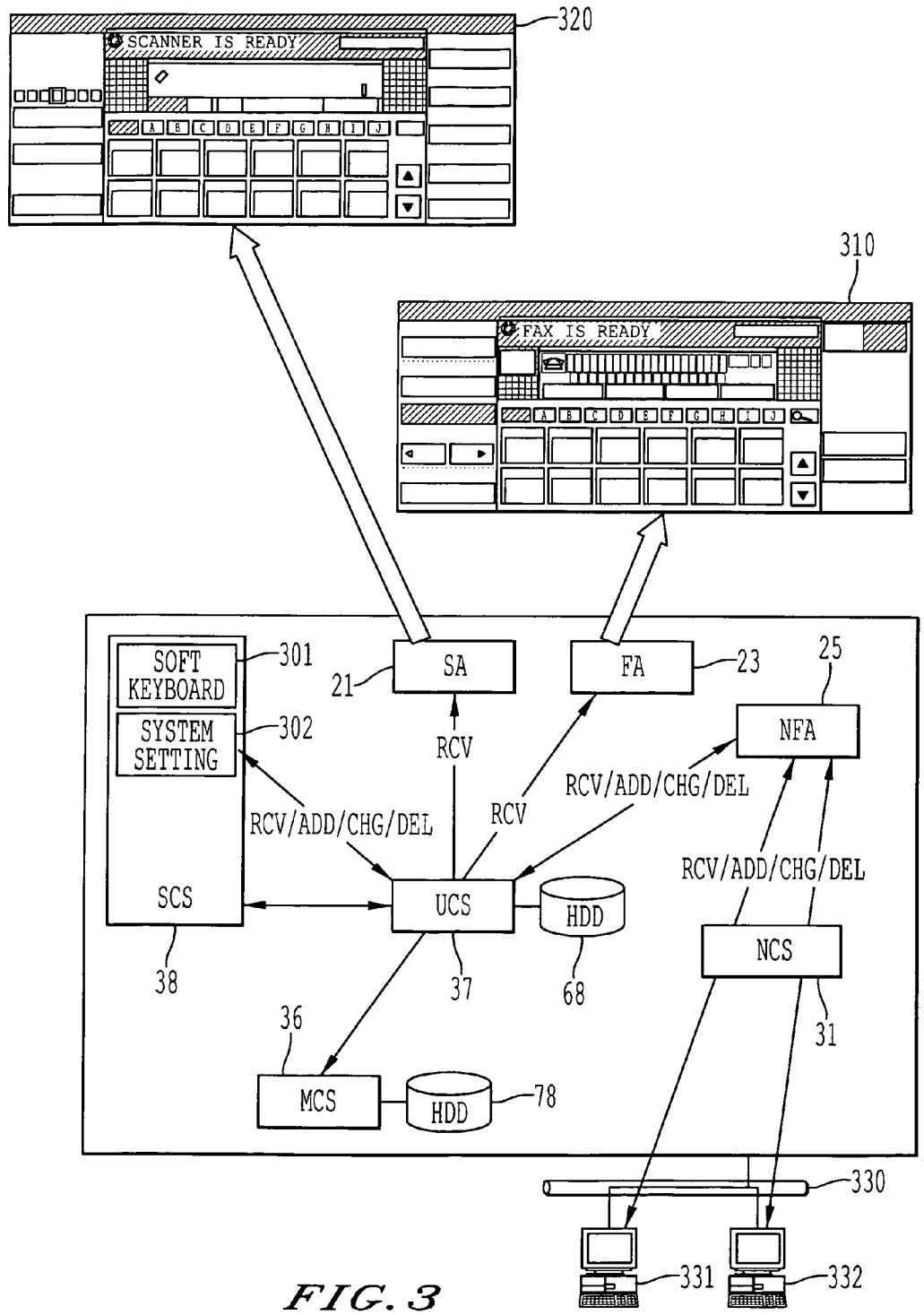
FIG. 3 is a diagram for explaining the shared data management method of the present embodiment.

FIG. 3 is a diagram for explaining the shared data management method of the present invention.

In addition, the composition which does not have necessity for the description is omitted in FIG. 3.

As shown in FIG. 3, the UCS 37 carries out unitary management of the user information which is an example of the shared data in the multi-function system 1.

For example, the UCS 37 stores address data of the user information in the HDD 68, and manages it. The user information which is managed by the UCS 37 is composed as shown in FIG. 4.

FIG. 4 is a diagram of an example of user information.

The user information of FIG. 4 includes, as the data items, the number of entry IDs, the title, the user code, the e-mail address, the facsimile number, the group data, the relay data, the authentication data, and the change order.

The data item "the number of entry IDs" indicates the number of entry cases which can be registered in the multi-function system 1. For example, when the entry ID number is 100, one hundred operators can be registered in the multi-function system 1.

The data item "title" indicates the title for classifying and displaying the entry cases registered. For example, when the titles are "A, B, C, D, . . . ", the entry cases are classified by the titles "A, B, C, D, . . . " and the corresponding titles are displayed. The data item "user code" is the identification information for identifying a particular operator. The data item "e-mail address" indicates the electronic e-mail address which is used as the destination address by the scanner application 24.

Moreover, the data item "facsimile number" indicates the facsimile number which is used as the destination address by the fax application 23.

The data item "group data" indicates a list of member IDs which are used for grouping of the entry cases registered. For example, the member ID list includes the entry ID of the operator who belongs to the group.

The data item "relay data" indicates the information which is used for relaying facsimile data.

The data item "authentication data" indicates the password which is required for the scanner application 24 to transmit the scanner data etc.

The data item "change order" indicates whether the change order of user information is possible or not.

The composition of the user information of FIG. 4 varies depending on the combination of the functions (the copy function, the facsimile function, the scanner function, etc.) included in the multi-function system 1.

By sending the acquisition request of user information to the UCS 37, the fax application 23 of FIG. 3 acquires user information required for the facsimile function, and displays the screen 310 on the operation panel 70 using the acquired user information.

The information for choosing the destination data (for example, fax number) which is needed to transmit the facsimile data is displayed on the screen 310.

By sending the acquisition request of user information to the UCS 37, the scanner application 24 of FIG. 3 acquires user information required for the scanner function, and displays the screen 320 on the operation panel 70 using the acquired user information.

The information for choosing the destination data (for example, electronic e-mail address) which is needed to transmit the scanner data is displayed on the screen 320.

The system setting function 302 of the SCS 38 acquires the necessary user information by sending the acquisition request of user information to the UCS 37.

The MCS 36 acquires the necessary user information by sending the acquisition request of user information to the UCS 37.

Moreover, the network file application (NFA) 25 acquires the necessary user information by sending the acquisition request of user information to the UCS 37 according to the request from the network device 331, 332 connected through the NCS 31 and the network 330.

In addition, the soft-keyboard function 301 of the SCS 38 controls the soft keyboard which displays the soft keyboard and is displayed on the operation panel 70.

As shown in FIG. 3, the network file application 25 or the system setting function 302 of the SCS 38 updates user information by sending the updating request of addition, change, or deletion of user information to the UCS 37.

The UCS 37 of FIG. 3 performs the read lock processing or the write lock processing, which will be described later, when user information is used and the updating request of user information occurs, when user information is updated and the acquisition request of user information occurs, or when user information is updated and the updating request of user information occurs.

A read lock request is sent to the UCS 37 before performing the acquisition request of user information, in order to request the USC 37 to perform the inhibition of updating of user information. In addition, the inhibition of updating of user information is canceled by receiving an unlock request corresponding to the read lock request.

Moreover, a write lock request is sent to the UCS 37 before performing the updating request of user information in order to request the UCS 37 to perform the inhibition of acquisition (reading) of user information and the inhibition of updating (writing) of user information by other application programs. In addition, the inhibition of acquisition of user information and the inhibition of updating of user information are canceled by receiving an unlock request corresponding to the write lock request.

Next, a description will be given of the read lock processing and the write lock processing performed by the UCS 37.

Figure 5:
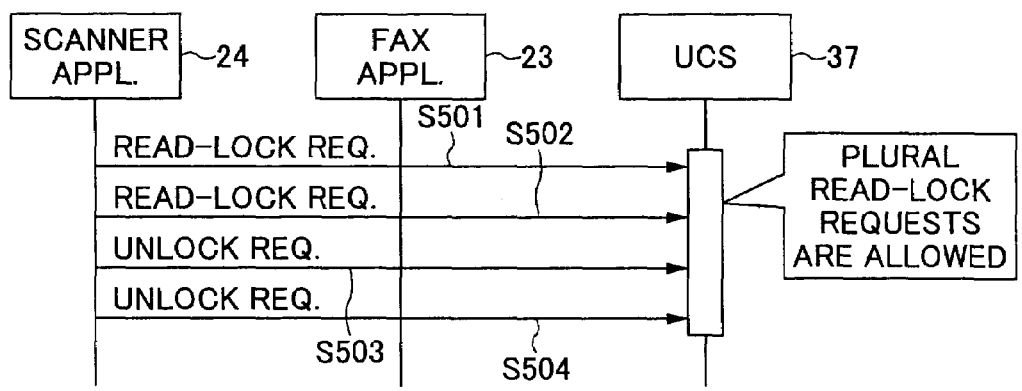
FIG. 5 is a sequence diagram for explaining an example of read lock processing.

FIG. 5 is a sequence diagram for explaining an example of the read lock processing.

At step S501, the read lock request is sent from the scanner application 24 to the UCS 37.

At step S502, before the unlock request corresponding to the read lock of step S501 is sent, the read lock request is sent from the scanner application 24 to the UCS 37.

As shown in the processing of FIG. 5, the receiving of the plural read locks from the same application (for example, the scanner application 24) at the UCS 37 is permitted because the problem does not arise even when the updating of user information is inhibited.

The acquisition request and acquisition response of user information are repeatedly exchanged between the scanner application 24 and the UCS 37 after the read lock requests are sent at step S501 and step S502. However, the illustration of such processing is omitted in FIG. 5.

Moreover, in the following description, the acquisition request and acquisition response of user information are repeatedly exchanged between the scanner application 24 and the UCS 37, but the illustration of such processing will be omitted in FIG. 5.

After the acquisition of user information is completed, the scanner application 24 sends the unlock request corresponding to step S501 and step S502 to the UCS 37 at step S503 and step S504, respectively, and the acquisition processing of user information is finished.

Figure 6:
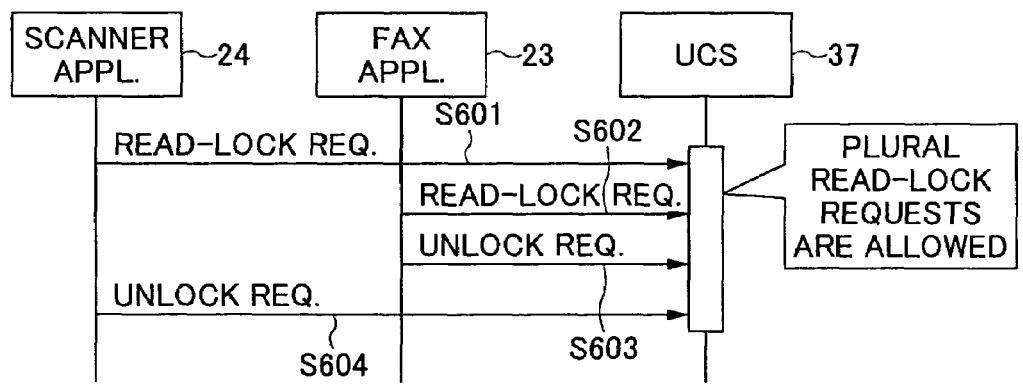
FIG. 6 is a sequence diagram for explaining another example of the read lock processing.

FIG. 6 is a sequence diagram for explaining another example of the read lock processing.

At step S601, the read lock request is sent from the scanner application 24 to the UCS 37.

At step S602, before the unlock request corresponding to the read lock request of step S601 is sent, the read lock request is sent from the fax application 23 to the UCS 37.

The receiving of the plural read lock requests from the different applications at the UCS 37 is permitted because the problem does not arise even when the updating of user information is inhibited.

After the read lock requests are sent to the UCS 37 at steps S601 and S602, the acquisition request and acquisition response of user information are exchanged repeatedly between the scanner application 24, the fax application 23 and the UCS 37. However, the illustration of such processing is omitted in FIG. 6.

After the acquisition of user information is completed, the fax application 23 sends the unlock request corresponding to step S602 to the UCS 37 at step S603, and the acquisition processing of user information is finished.

Moreover, the scanner application 24 sends the unlock request corresponding to step S601 to the UCS 37 at step S604, and ends the acquisition processing of user information.

Figure 7:
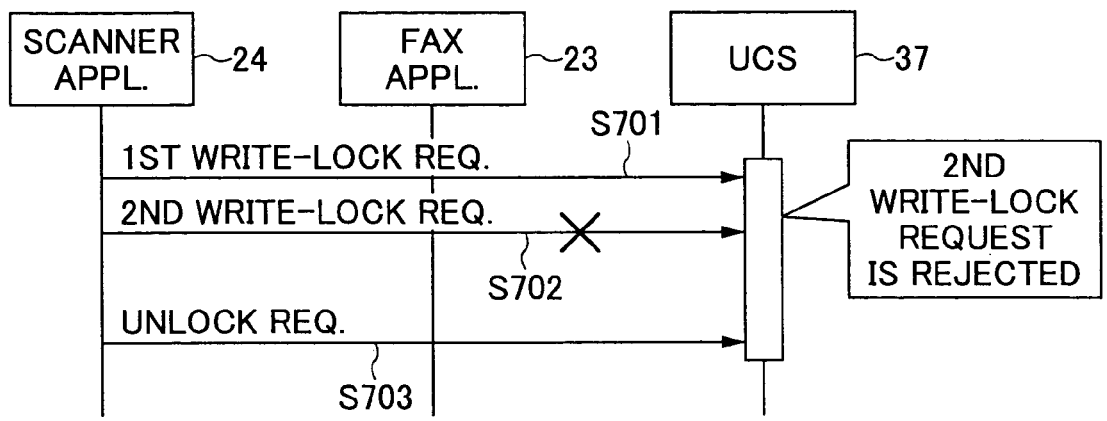
FIG. 7 is a sequence diagram for explaining an example of write lock processing.

FIG. 7 is a sequence diagram for explaining an example of the write lock processing.

At step S701, the write lock request is sent from the scanner application 24 to the UCS 37.

At step S702, before the unlock request corresponding to the write lock request of step S701 is sent, the write lock request is sent from the scanner application 24 to the UCS 37.

The receiving of the plural write lock requests from the same application (for example, the scanner application 24) at the UCS 37 is not permitted because the problem, such as the conflict of the ser information after the updating is performed, does arise when the updating of user information is inhibited. Therefore, the receiving of the write lock request of step S702 at the UCS 37 is rejected.

After the write lock request is sent at step S701, the updating request and updating response of user information are exchanged repeatedly between the scanner application 24 and the UCS 37. However, the illustration of such processing is omitted in FIG. 7.

In the following description, the updating request and updating response of user information are similarly exchanged between the scanner application 24 and the UCS 37, but the illustration of such processing will be omitted.

After the updating of user information is completed, the scanner application 24 sends the unlock request corresponding to step S701 to the UCS 37 at step S703, and the updating process of user information is finished.

Figure 8:
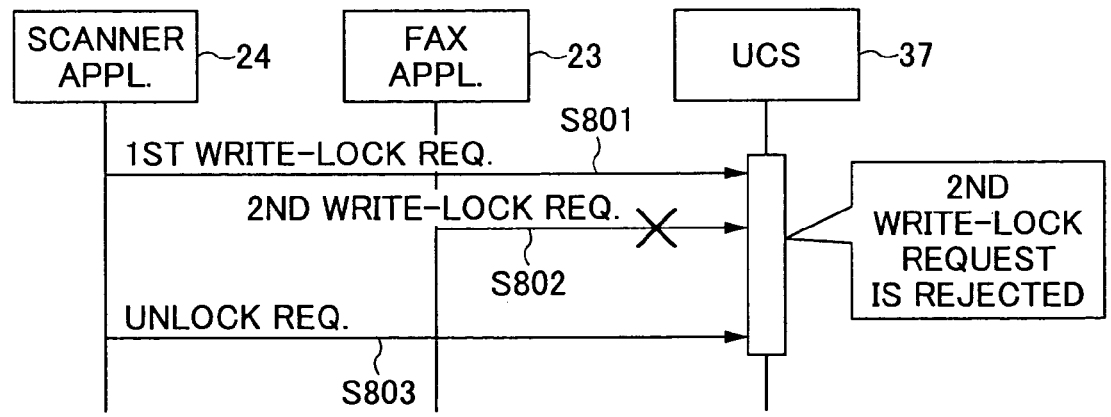
FIG. 8 is a sequence diagram for explaining another example of the write lock processing.

FIG. 8 is a sequence diagram for explaining another example of the write lock processing.

At step S801, the write lock request is sent from the scanner application 24 to the UCS 37.

At step S802, before the unlock request corresponding to the write lock request of step S801 is sent, the write lock request is sent from the fax application 23 to the UCS 37.

The receiving of the plural write lock requests from the different applications at the UCS 37 is not permitted because the problem, such as the conflict of the user information after the updating is performed, does arise when the updating of user information is inhibited. Therefore, the write lock request of step S802 is rejected.

In addition, after the write lock request is sent at step S801, the updating request and updating response of user information are exchanged repeatedly between the scanner application 24 and the UCS 37, but the illustration of such processing is omitted in FIG. 8.

After the updating of user information is completed, the scanner application 24 sends the unlock request corresponding to step S801 to the UCS 37 at step S803, and the updating process of user information is finished.

Figure 9:
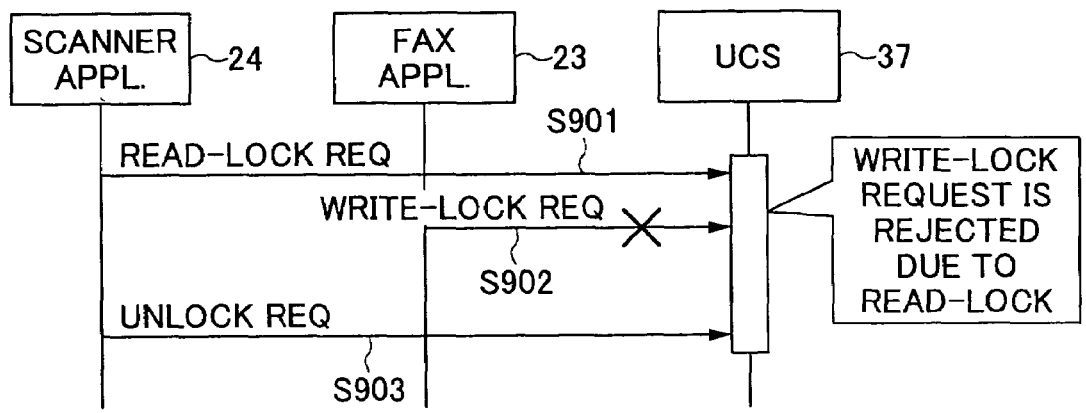
FIG. 9 is a sequence diagram for explaining an example of read lock and write lock processing.

FIG. 9 is a sequence diagram for explaining an example of the read lock and write lock processing.

At step S901, the read lock request is sent from the scanner application 24 to the UCS 37.

At step S902, before the unlock request corresponding to the read lock request of step S901 is sent, the write lock request is sent from the fax application 23 to the UCS 37.

The receiving of the write lock request at the UCS 37 before the unlocking request corresponding to the read lock request sent previously is sent is not permitted since the updating of user information is inhibited by such read lock request. Therefore, the write lock request of step S902 is rejected.

In addition, after the read lock request is sent at step S901, the acquisition request and acquisition response of user information are exchanged repeatedly between the scanner application 24 and the UCS 37, but the illustration of such processing is omitted in FIG. 9.

After the acquisition of user information is completed, the scanner application 24 sends the unlock request corresponding to step S901 to the UCS 37 at step S903, and the acquisition processing of user information is finished.

Figure 10:
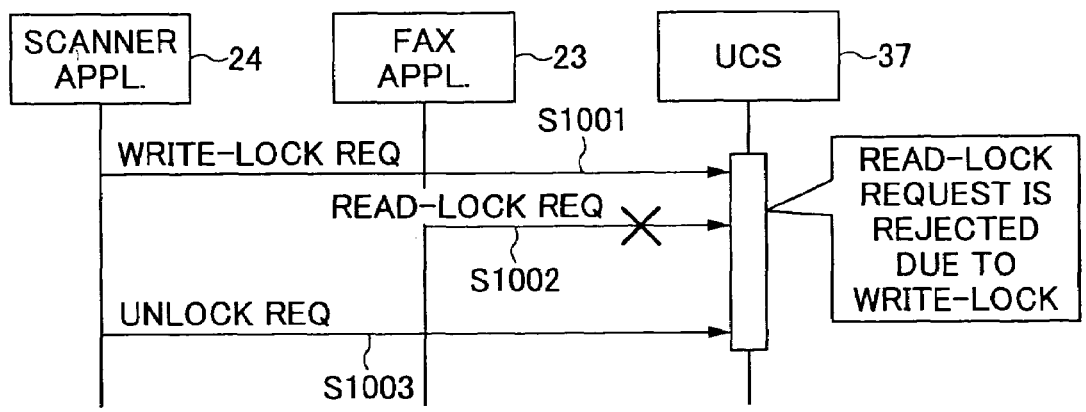
FIG. 10 is a sequence diagram for explaining another example of the read lock and write lock processing.

FIG. 10 is a sequence diagram for explaining another example of the read lock and write lock processing.

At step S1001, the write lock request is sent from the scanner application 24 to the UCS 37.

At step S1002, before the unlock request corresponding to the write lock request of step S1001 is sent, the read lock request is sent from the fax application 23 to the UCS 37.

The receiving of the read lock request at the UCS 37 before the unlocking request corresponding to the write lock request sent previously is sent is not permitted since the updating of user information is inhibited by such write lock request. Therefore, the read lock request of step S1002 is rejected.

In addition, after the write lock request is sent at step S1001, the updating request and updating response of user information are exchanged repeatedly between the scanner application 24 and the UCS 37, but the illustration of such processing is omitted in FIG. 10.

After the updating of user information is completed, the scanner application 24 sends the unlock request corresponding to step S1001 to the UCS 37 at step S1003, and the updating processing of user information is finished.

Next, a description will be given of under information updating notice processing in which the user information is updated when the write lock request is sent.

Figure 11:
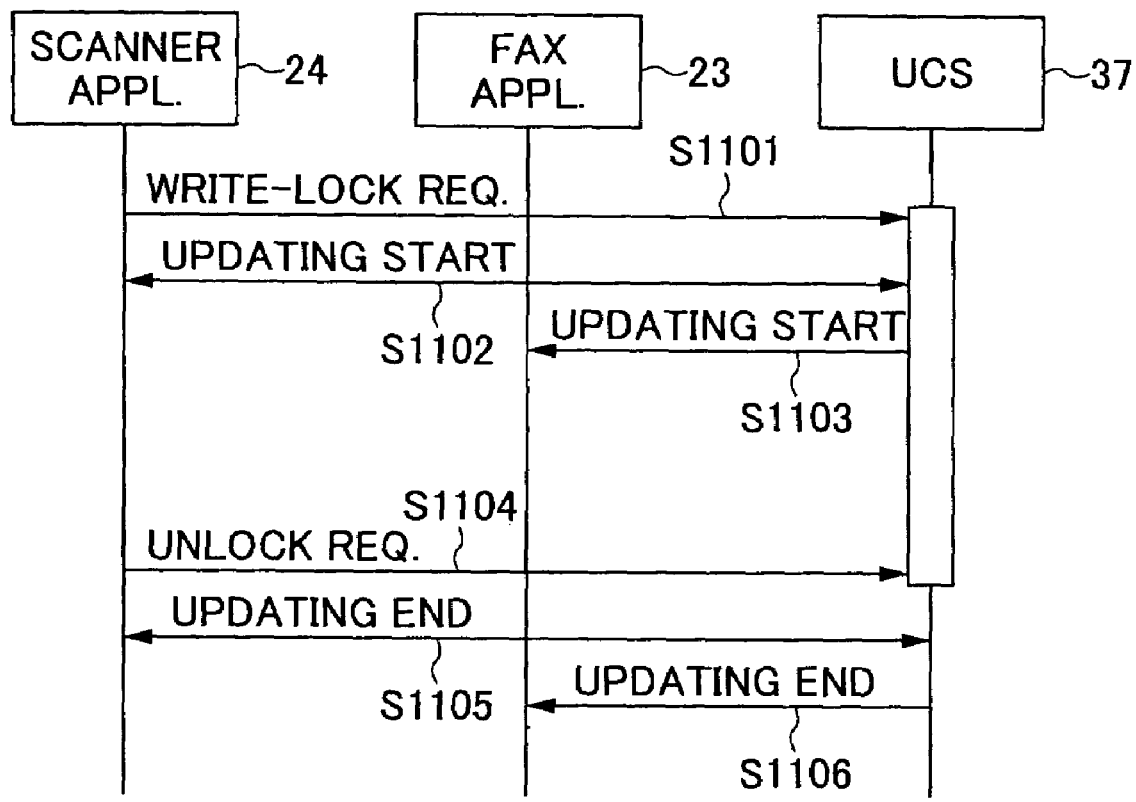
FIG. 11 is a sequence diagram for explaining an example of user information updating notice processing.

FIG. 11 is a sequence diagram for explaining an example of the under information updating notice processing.

At step S1101, the write lock request is sent from the scanner application 24 to the UCS 37.

At step S1102, the UCS 37 notifies the updating start of user information to the scanner application 24.

Moreover, at step S1103, the UCS 37 notifies the updating start of user information to the fax application 23.

By the updating start of user information being notified, the fax application 23 and the scanner application 24 recognize a possibility that user information will be updated.

After the updating of user information is completed, the scanner application 24 sends the unlock request corresponding to step S1101 to the UCS 37 at step S1104.

At step S1105, the UCS 37 notifies the updating end of user information to the scanner application 24.

Moreover, at step S1106, the UCS 37 notifies the updating end of user information to the fax application 23.

By the updating end of user information being notified, the fax application 23 and the scanner application 24 recognize that user information is updated.

After the updating end of user information is notified, the fax application 23, the scanner application 24, etc. acquire the updated user information.

In addition, when the display request of the screen 310 or the screen 320 occurs during the period after the updating start of user information is notified until the updating end is notified, the fax application 23, the scanner application 24, etc. display a different screen, which indicates that the user information is updating, on the operation panel 70 instead of the screen 310 and the screen 320.

Figure 12:
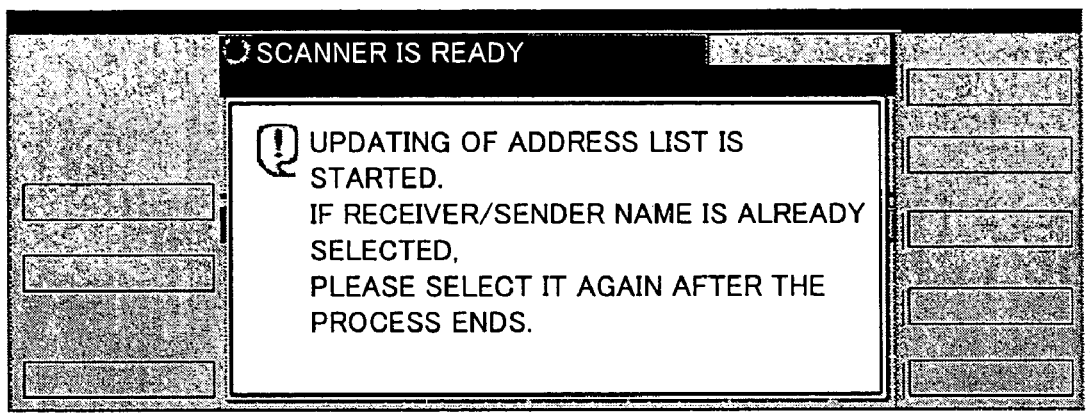
FIG. 12 is a diagram showing a screen of the start of address list updating processing.

For example, the scanner application 24 displays the screen, which is shown in FIG. 12, on the operation panel 70.

FIG. 12 shows an example of the screen of the start of address list updating processing.

Moreover, when the updating end of user information is notified, the fax application 23, the scanner application 24, etc. display a different screen, which indicates that the user information is updated, on the operation panel 70.

Figure 13:
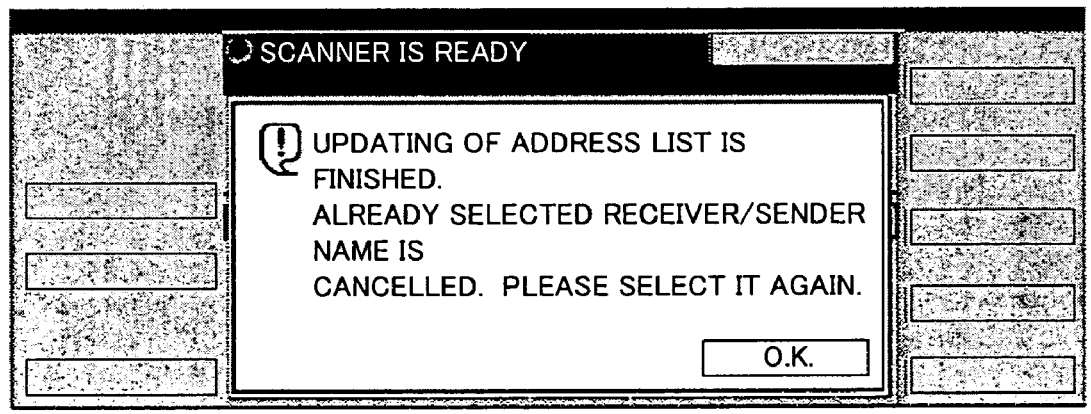
FIG. 13 is a diagram showing a screen of the end of the address list updating processing.

For example, the scanner application 24 displays the screen, which is shown in FIG. 13, on the operation panel 70.

FIG. 13 shows an example of the screen of the end of the address list updating processing.

The fax application 23, the scanner application 24, etc. are provided to display the screens shown in FIG. 12 and FIG. 13 on the operation panel 70, so that they notify the operator of the updating start and updating end of user information.

By the way, at step S802 in the processing of FIG. 8, the write lock request is sent from the fax application 23 to the UCS 37 before the unlock request corresponding to the write lock request of step S801 is sent, and the write lock request which is sent by the fax application 23 is rejected. Therefore, the fax application 23 is required to send again the write lock request to the UCS 37 following the step S802.

Moreover, at step S902 in the processing of FIG. 9, the write lock request is sent from the fax application 23 to the UCS 37 before the unlock request corresponding to the read lock request of step S901 is sent, the write lock request which is sent by the fax application 23 is rejected. Therefore, the fax application 23 is required to send again the write lock request to the UCS 37 after the step S902.

Moreover, at step S1002 in the processing of FIG. 10, the read lock request is sent from the fax application 23 to the UCS 37 before the unlock request corresponding to the write lock request of step S1001 is sent, the read lock request which is sent by the fax application 23 is rejected. Therefore, the fax application 23 is required to send again the read lock request to the UCS 37 following the step S1002.

In the examples of FIG. 8-FIG. 10, when the write lock request or the read lock request is rejected, the fax application 23 is required to send again the write lock request or the read lock request to the UCS 37. Hence, in the above-described processing, the redundant steps must be performed.

Figure 14:
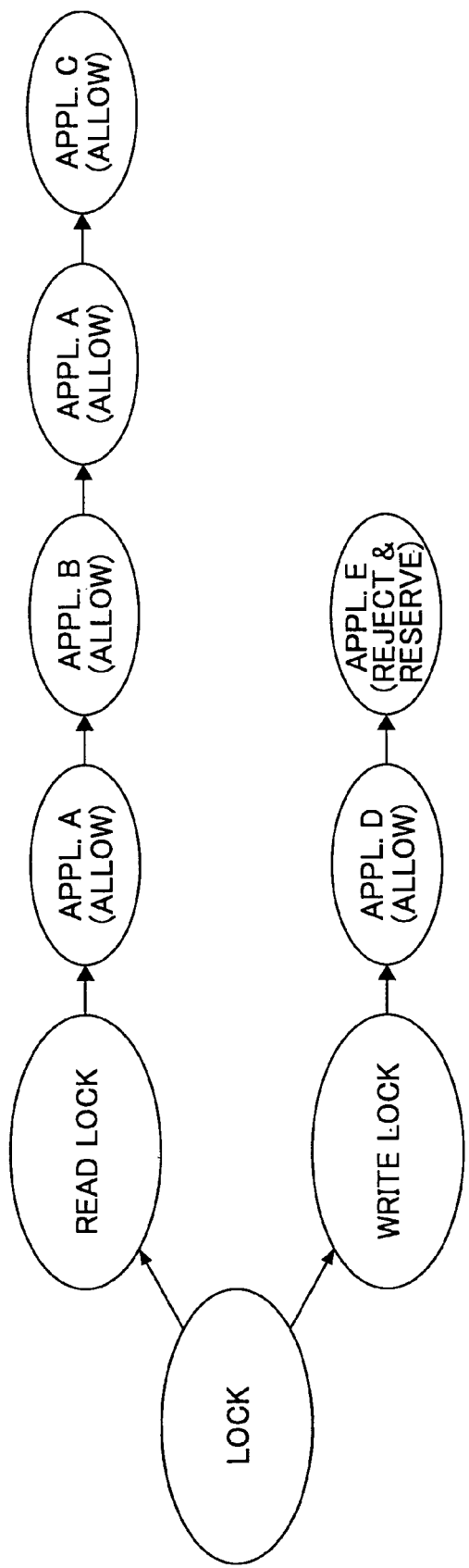
FIG. 14 is a diagram for explaining management of a rejected write-lock or read-lock request.

In order to overcome the problem, the shared data management method of the present invention is provided to perform write lock reservation or read lock reservation processing so that it manages the rejected write lock or read lock request, and the rejected write lock or read lock request may be sent after the reason of the rejection is eliminated as shown in FIG. 14.

FIG. 14 is a diagram for explaining the management of the rejected write lock or read lock request.

If the write lock or read lock request is sent from the fax application 23 or the scanner application 24, the UCS 37 arranges the information on the fax application 23 or the scanner application 24 which has sent the write lock or the read lock request, in the read lock queue or write lock queue which is stored to manage the state of the lock.

For example, in the case of FIG. 14, the read lock requests are sent by the application A, the application B, the application A, and the application C in this order, and the write lock requests are sent by the application D and the application E in this order.

In addition, in the case of FIG. 14, it is supposed that the write lock request which is sent by the application E is rejected, and the write lock reservation processing is performed for the rejected write lock request.

Therefore, by performing the write lock reservation or read lock reservation processing as shown in FIG. 14, the UCS 37 can send again the write lock request or the read lock request after the reason of the rejection is eliminated.

Next, a description will be given of the write lock reservation or read lock reservation processing which is performed by the present invention.

In the following embodiment, the fax application 23 and the scanner application 24 are provided to display user information on the operation panel 70 but the network file application 25 is not provided to display user information on the operation panel 70.

Figure 15:
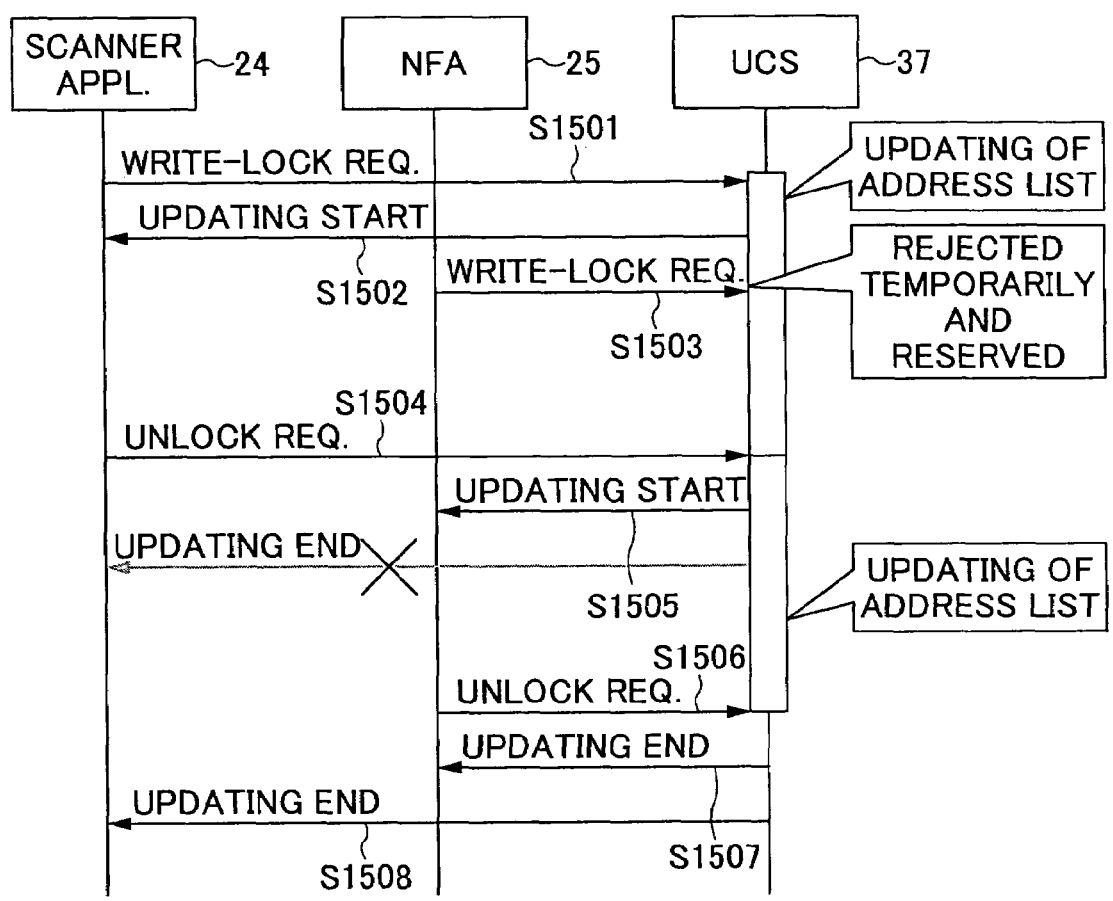
FIG. 15 is a sequence diagram for explaining an embodiment of write-lock request reservation processing of the present invention.

FIG. 15 is a sequence diagram for explaining an embodiment of the write lock reservation processing according to the present invention.

At step S1501, the write lock request is sent from the scanner application 24 to the UCS 37.

At step S1502, the UCS 37 notifies the updating start of user information to the scanner application 24.

In addition, the UCS 37 does not notify the updating start of user information to the network file application 25. The network file application 25 is not provided to display the user information or the screen shown in FIG. 12 or FIG. 13 on the operation panel 70.

At step S1503, the rewriting request of user information occurs from the network device 331 etc., and the write lock request is sent from the network file application 25 to the UCS 37.

However, since the write lock state of step S1501 is not unlocked yet, the write lock request of step S1503 is rejected.

The UCS 37 carries out the write lock reservation processing as shown in FIG. 14 by handling the rejected write lock request of step, S1503.

After the updating of user information is completed, the scanner application 24 sends the unlock request corresponding to step S1501 to the UCS 37 at step S1504.

At step S1504, the write lock state of step S1501 is unlocked, and the reason of rejecting the write lock request at step S1503 is eliminated. Therefore, the UCS 37 receives the write lock request of step S1503 based on the write lock reservation.

At step S1505, the UCS 37 notifies the updating start of user information to the network file application 25.

After the updating of user information is completed, the network file application 25 sends the unlock request corresponding to step S1503 to the UCS 37 at step S1506.

At step S1507, the UCS 37 notifies the updating end of user information to the network file application 25.

Moreover, at step S1508, the UCS 37 notifies the updating end of user information to the scanner application 24.

In the write lock reservation processing of FIG. 15, after the reason of the rejection is eliminated, the rejected write lock request can be received automatically.

Figure 16:
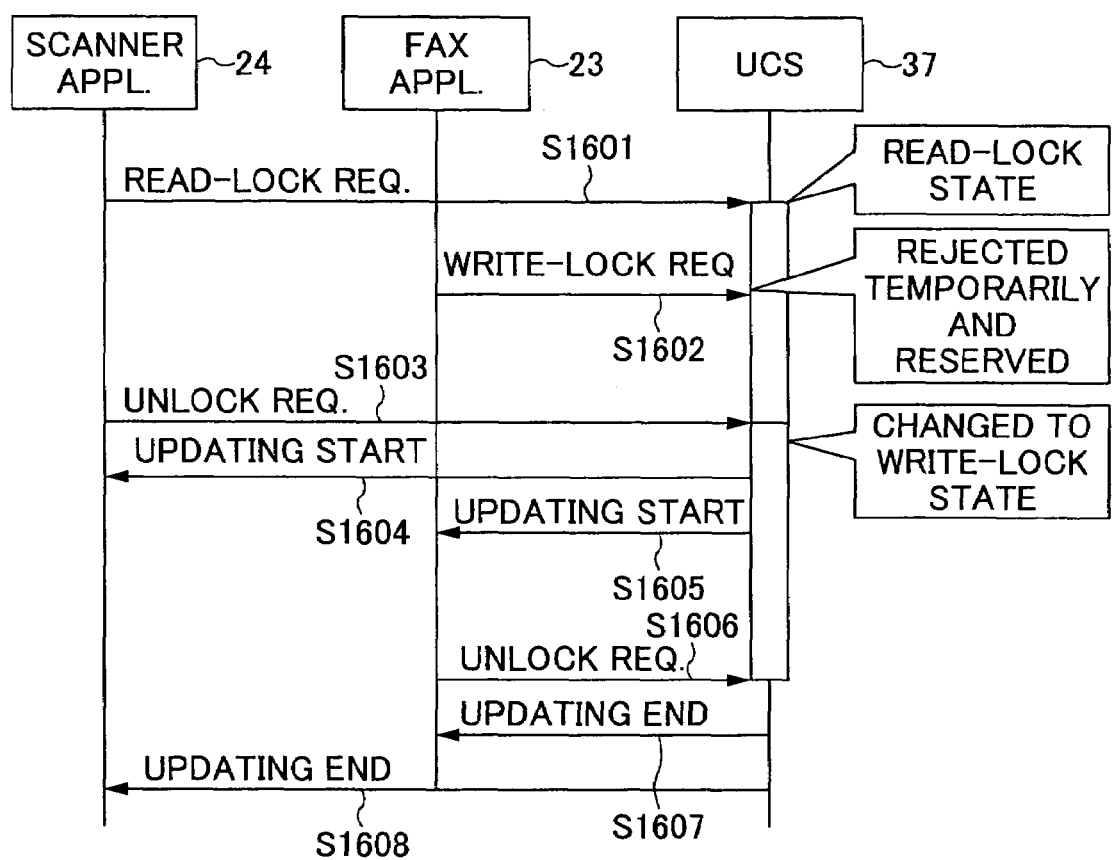
FIG. 16 is a sequence diagram for explaining another embodiment of the write-lock request reservation processing.

FIG. 16 is a sequence diagram for explaining another embodiment of the write lock reservation processing according to the present invention.

At step S1601, the read lock request is sent from the scanner application 24 to the UCS 37.

At step S1602, the write lock request is sent from the fax application 23 to the UCS 37. However, the read lock state of step S1601 is not unlocked yet, the write lock request of step S1602 is rejected.

The UCS 37 carries out the write lock reservation processing by handling the write lock request rejected at step S1602, as shown in FIG. 14.

After the updating of user information is completed, the scanner application 24 sends the unlock request corresponding to step S1601 to the UCS 37 at step S1603.

At step S1603, the read lock state of step S1601 is unlocked, and the reason of rejecting the write lock request at step S1602 is eliminated. Therefore, the UCS 37 receives the write lock request of step S1602 based on the write lock reservation.

At step S1604, the UCS 37 notifies the updating start of user information to the scanner application 24.

Moreover, at step S1605, the UCS 37 notifies the updating start of user information to the fax application 23.

After the updating of user information is completed, the fax application 23 sends the unlock request corresponding to step S1602 to the UCS 37 at step S1606.

At step S1607, the UCS 37 notifies the updating end of user information to the fax application 23.

Moreover, at step S1608, the UCS 37 notifies the updating end of user information to the scanner application 24.

In the write lock reservation processing of FIG. 16, after the reason of the rejection is eliminated, the rejected write lock request can be received automatically.

Figure 17:
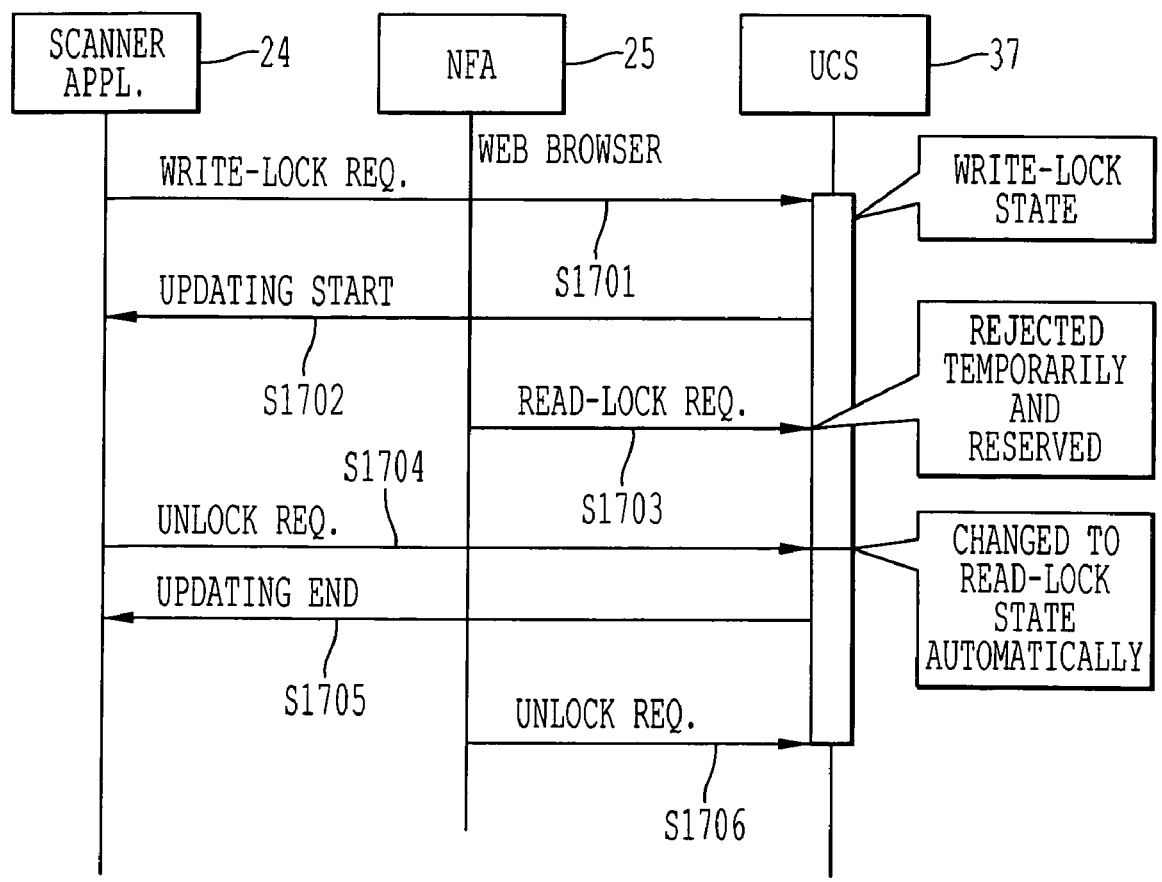
FIG. 17 is a sequence diagram for explaining an embodiment of read-lock request reservation processing of the present invention.

FIG. 17 is a sequence diagram for an embodiment of the read lock reservation processing according to the present invention.

At step S1701, the write lock request is sent from the scanner application 24 to the UCS 37.

At step S1702, the UCS 37 notifies the updating start of user information to the scanner application 24.

In addition, the UCS 37 does not notify the updating start of user information to the network file application 25. The network file application 25 is not provided to display the user information or the screen shown in FIG. 12 or FIG. 13 on the operation panel 70.

At step S1703, the acquisition request of user information occurs from the network device 331 etc., and the read lock request is sent from the network file application 25 to the UCS 37.

However, since the write lock state of step S1701 is not unlocked yet, the read lock request of step S1703 is rejected.

The UCS 37 carries out the read lock reservation processing by handling the read lock request rejected at step S1703 as shown in FIG. 14.

After the updating of user information is completed, the scanner application 24 sends the unlock request corresponding to step S1701 to the UCS 37 at step S1704.

At step S1704, the write lock state of step S1701 is unlocked, and the reason of rejecting the read lock request at step S1703 is eliminated. Therefore, the UCS 37 automatically accepts the read lock request of step S1703 based on the read lock reservation.

At step S1705, the UCS 37 notifies the updating end of user information to the scanner application 24.

After the acquisition of user information is completed, the network file application 25 sends the unlock request corresponding to step S1703 to the UCS 37 at step S1706.

In the read lock reservation processing of FIG. 17, after the reason of the rejection is eliminated, the rejected read lock request can be received automatically.

By the way, the read lock request received by the UCS 37 must be cancelled by sending the unlock request corresponding to the read lock request to the UCS 37. Moreover, the write lock request received by the UCS 37 must be cancelled by sending the unlock request corresponding to the write lock request to the UCS 37.

Figure 18:
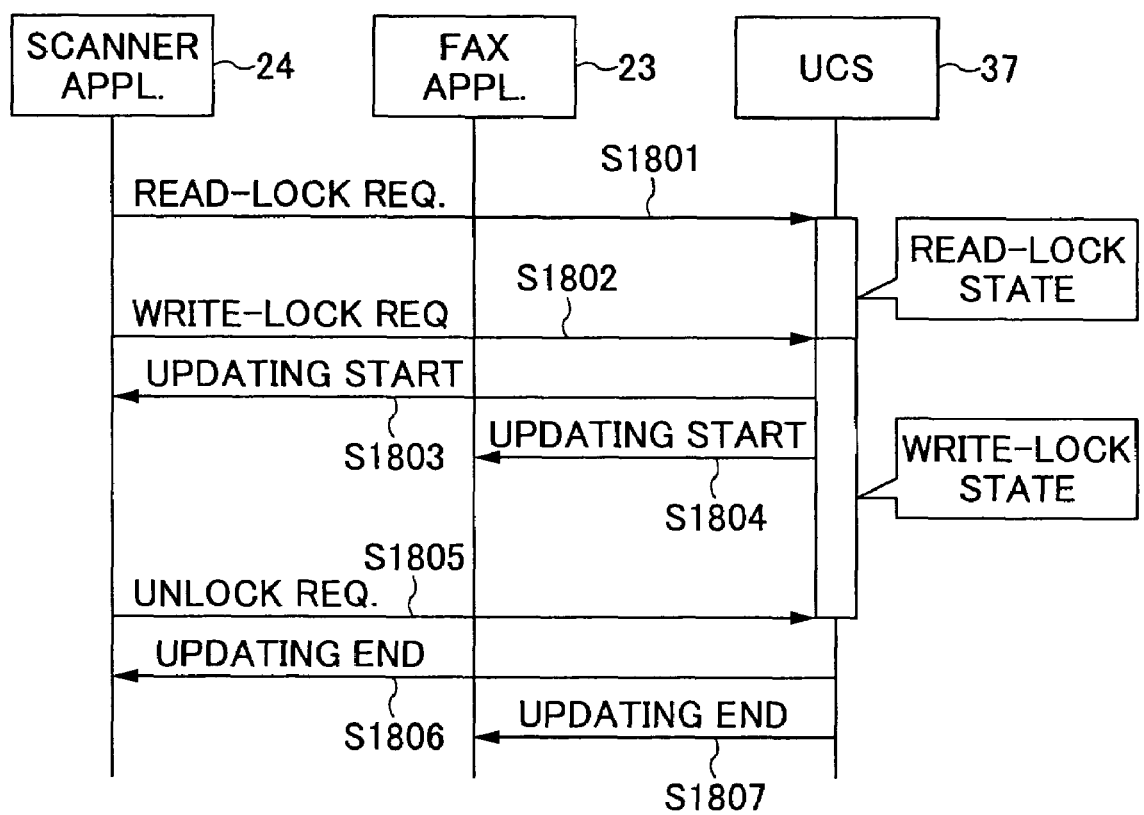
FIG. 18 is a sequence diagram for explaining an embodiment of unlock request omission processing of the present invention.

However, when the same application program sends the read lock request and the write lock request continuously to the UCS 37, sending the unlock request corresponding to the read lock request or write lock request sent previously can be omitted as follows FIG. 18 is a sequence diagram for explaining an embodiment of the unlock omission processing of the present invention.

At step S1801, the read lock request is sent from the scanner application 24 to the UCS 37.

After the reading out of user information is completed, the scanner application 24 sends at step S1802 the write lock request to the UCS 37.

That is, the same scanner application 24 sends the read lock request of step S1801 and the write lock request of step S1802 to the UCS 37.

Thus, when sending the write lock request continuously at step S1802 after the same scanner application 24 sends the read lock request at step S1801, the function of sending the unlock request corresponding to the read lock request of step S1801 can be allocated to the write lock request of step S1802 previously sent.

Therefore, when sending the write lock request continuously after the same scanner application 24 sends the read lock request, the unlock request corresponding to the read lock request of step S1801 sent previously can be omitted.

At step S1803, the UCS 37 notifies the updating start of user information to the scanner application 24.

Moreover, at step S1804, the UCS 37 notifies the updating start of user information to the fax application 23.

After the updating of user information is completed, the scanner application 24 sends the unlock request corresponding to step S1802 to the UCS 37 at step S1805.

At step S1806, the UCS 37 notifies the updating end of user information to the scanner application 24.

Moreover, at step S1807, the UCS 37 notifies the updating end of user information to the fax application 23.

In the unlock omission processing of FIG. 18, when the write lock request is sent continuously after the read lock request is sent by the same scanner application 24, the unlock request corresponding to the previously sent read lock request of step S1801 can be omitted.

Figure 19:
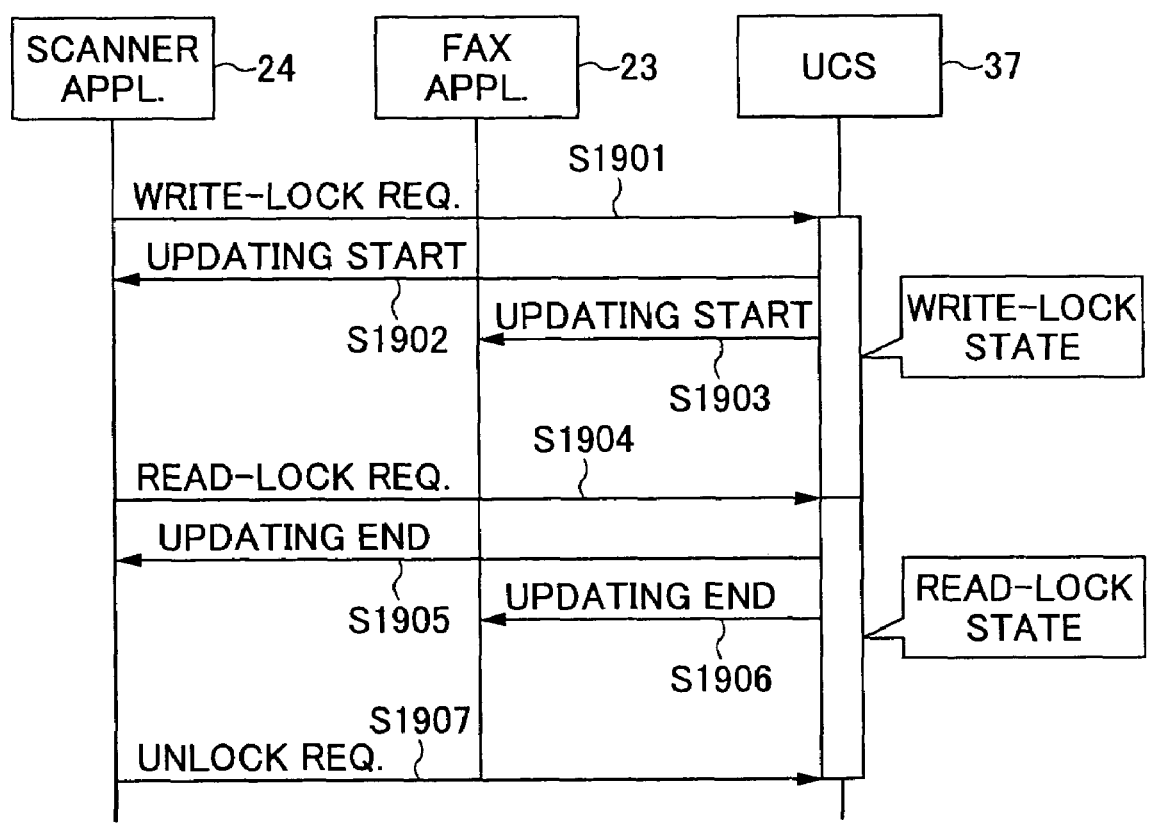
FIG. 19 is a sequence diagram for explaining another embodiment of the unlock request omission processing.

FIG. 19 is a sequence diagram for explaining another embodiment of the unlock omission processing of the present invention.

At step S1901, the write lock request is sent from the scanner application 24 to the UCS 37.

At step S1902, the UCS 37 notifies the updating start of user information to the scanner application 24.

Moreover, at step S1903, the UCS 37 notifies the updating start of user information to the fax application 23.

After the updating of user information is completed, the scanner application 24 sends the read lock request to the UCS 37 at step S1904.

That is, the write lock processing of step S1901 and the read lock processing of step S1904 are carried out by the same scanner application 24.

Thus, when the read lock request is sent continuously at step S1904 after the write lock request is sent at step S1901 by the same scanner application 24, the function of the unlock request corresponding to the write lock request of step S1901 can be allocated to the subsequently sent read lock request of step S1904.

Therefore, when the read lock request is sent continuously after the write lock request is sent by the same scanner application 24, the unlock request corresponding to the previously sent write lock request of step S1901 can be omitted.

At step S1905, the UCS 37 notifies the updating end of user information to the scanner application 24.

Moreover, at step S1906, the UCS 37 notifies the updating end of user information to the fax application 23.

After the acquisition of user information is completed, the scanner application 24 sends the unlock request corresponding to step S1904 to the UCS 37 at step S1907.

In the unlock omission processing of FIG. 19, when the read lock request is sent continuously after the write lock request is sent by the same scanner application 24, the unlock request corresponding to the previously sent write lock request of step S1901 can be omitted.

Figure 20:
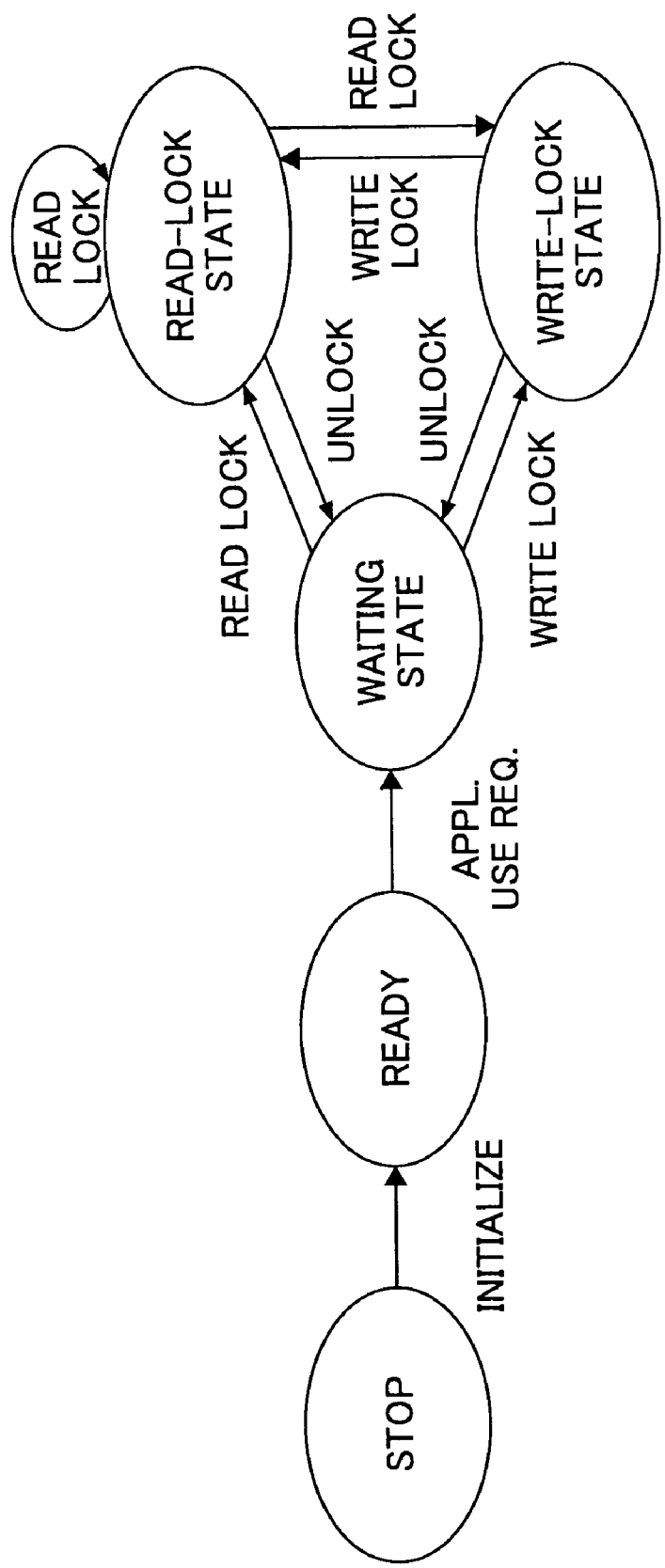
FIG. 20 is a diagram for explaining the transition of lock state.

By using the unlock omission processing of FIG. 18 or FIG. 19, the lock state of user information such as the read lock state or the write lock state is changed as shown in FIG. 20.

FIG. 20 is a diagram for explaining the transition of the lock state.

For example, the application program, such as the scanner application 24, changes from the stop state to the ready state by the initializing processing (initialization).

The application program in the ready state changes to the waiting state by sending the application use request to the UCS 37.

The application program in the waiting state changes to the read lock state or the write lock state by sending the read lock request or the write lock request to the UCS 37.

In addition, the application program in the read lock state or the application in the write lock state changes back to the waiting state by sending the unlock request. The application program in the read lock state remains unchanged (the read lock state) by sending the read lock request to the UCS 37.

On the other hand, by sending the write lock request to the UCS 37 through the unlock omission processing of FIG. 18, the application program in the read lock state can omit the sending of the unlock request to the UCS 37. It can change to the write lock state from the read lock state.

Moreover, by sending the read lock request to the UCS 37 through the unlock omission processing of FIG. 19, the application program in the write lock state can omit the sending of the unlock request to the UCS 37. It can change to the read lock state from the write lock state.

By the way, the fax application 23, the scanner application 24, etc. need to acquire user information beforehand. After the updating end of user information is notified, they must acquire the updated user information immediately.

On the other hand, the application program which acquires user information at the time of starting of the multi-function system 1 does not need to acquire user information beforehand. After the updating end of user information is notified, such application program does not need to acquire the updated user information immediately.

Moreover, the network file application 25 etc. does not need to display user information on the operation panel 70 and does not need to acquire user information beforehand, after the updating end of user information is notified, it does not need to acquire the updated user information immediately.

Therefore, the user information updating notice (updating start and updating end) shown in FIG. 11 is efficient especially when one of the fax application 23, the scanner application 24, etc. which must acquire user information beforehand is selected and the notice processing is performed for the selected application program.

Next, a description will be given of the user information updating notice processing which notifies the notice of change of user information selectively.

Figure 21:
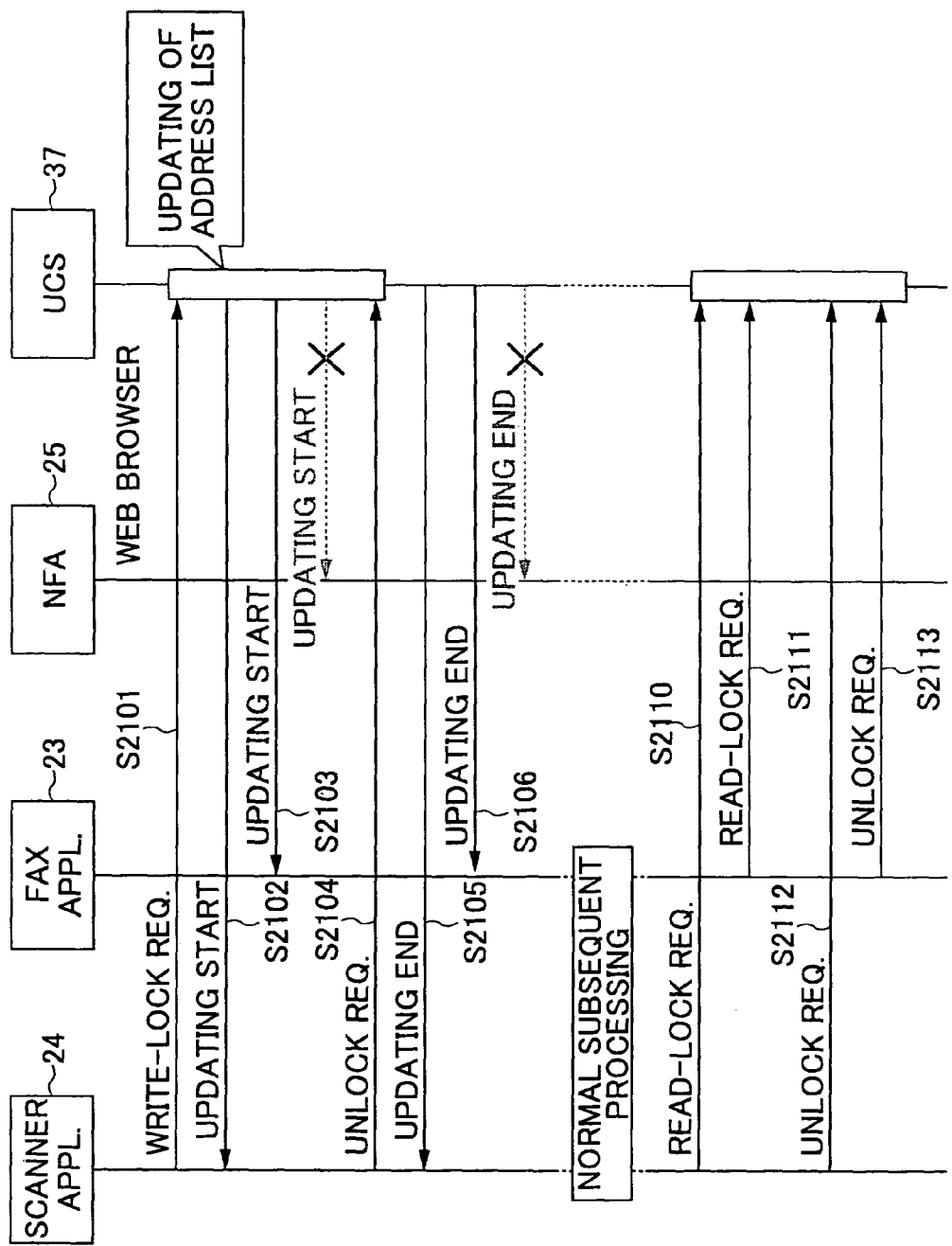
FIG. 21 is a sequence diagram for explaining an embodiment of user information updating notice processing of the present invention.

FIG. 21 is a sequence diagram for explaining an embodiment of the user information updating notice processing according to the present invention.

In the present embodiment, the fax application 23 and the scanner application 24 are provided to display user information on the operation panel 70. Moreover, the network file application 25 is not provided to display user information on the operation panel 70.

At step S2101, the write lock request is sent from the scanner application 24 to the UCS 37.

At step S2102, the UCS 37 notifies the updating start of user information to the scanner application 24.

Moreover, at step S2103, the UCS 37 notifies the updating start of user information to the fax application 23.

In addition, the UCS 37 does not notify the updating start of user information to the network file application 25. The network file application 25 is not provided to display the user information or the screen of FIG. 12 or FIG. 13 on the operation panel 70.

After the updating of user information is completed, the scanner application 24 sends the unlock request corresponding to step S2101 to the UCS 37 at step S2104.

At step S2105, the UCS 37 notifies the updating end of user information to the scanner application 24.

Moreover, at step S2106, the UCS 37 notifies the updating end of user information to the fax application 23.

In addition, the UCS 37 does not notify the updating end of user information to the network file application 25. It is not necessary for the network file application 25 to display the user information or the screen of FIG. 12 or FIG. 13 on the operation panel 70. It is not necessary for the network file application 25 to acquire the updated user information immediately after the updating is performed.

When the updating end of user information is notified, the scanner application 24 sends the read lock request to the UCS 37 at step S2110.

Moreover, the fax application 23 sends the read lock request to the UCS 37 at step S2111.

After the acquisition of user information is completed, the scanner application 24 sends the unlock request corresponding to step S2110 to the UCS 37 at step S2112, and the acquisition processing of user information is finished.

Moreover, the fax application 23 sends the unlock request corresponding to step S2111 to the UCS 37 at step S2113, and the acquisition processing of user information is finished.

The user information updating notice processing of FIG. 21 can save the resources of the multi-function system 1 by omitting the unneeded notice of the updating start and the unneeded notice of the updating end.

Figure 22:
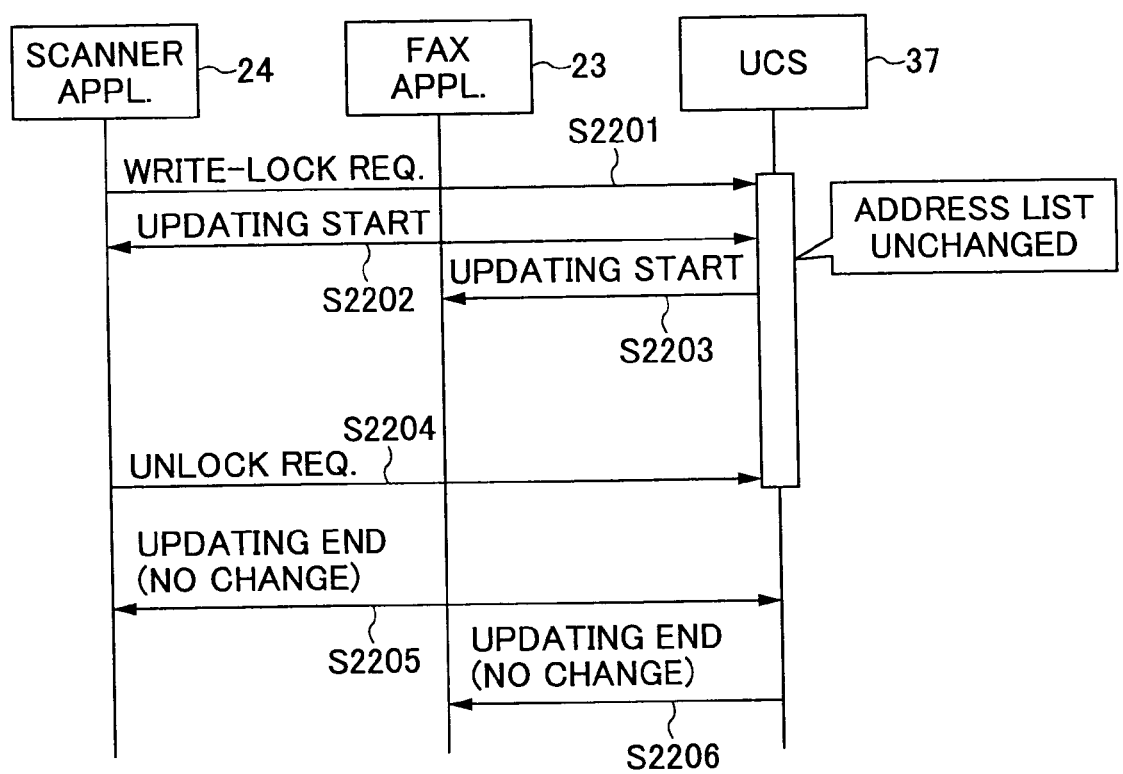
FIG. 22 is a sequence diagram for explaining another embodiment of the user information updating notice processing.

FIG. 22 is a sequence diagram for explaining another embodiment of the user information updating notice processing of the present invention.

At step S2201, the write lock request is sent from the scanner application 24 to the UCS 37.

At step S2202, the UCS 37 notifies the updating start of user information to the scanner application 24.

Moreover, at step S2203, the UCS 37 notifies the updating start of user information to the fax application 23.

In this case, suppose that the updating of user information is not performed.

The scanner application 24 sends the unlock request corresponding to step S2201 to the UCS 37 at step S2204.

At step S2205, the UCS 37 notifies the updating end of user information to the scanner application 24.

Moreover, at step S2206, the UCS 37 notifies the updating end of user information to the fax application 23.

In the present embodiment, the information indicating that the updating of user information is not performed may be contained in the notice of the updating end sent at step S2205 and step S2206, which allows the fax application 23 and the scanner application 24 to omit the acquisition processing of user information when such a notice is received.

The user information updating notice processing of FIG. 22 can save the resources of the multi-function system 1 by omitting the acquisition processing of user information which is unnecessary to perform.

Figure 23:
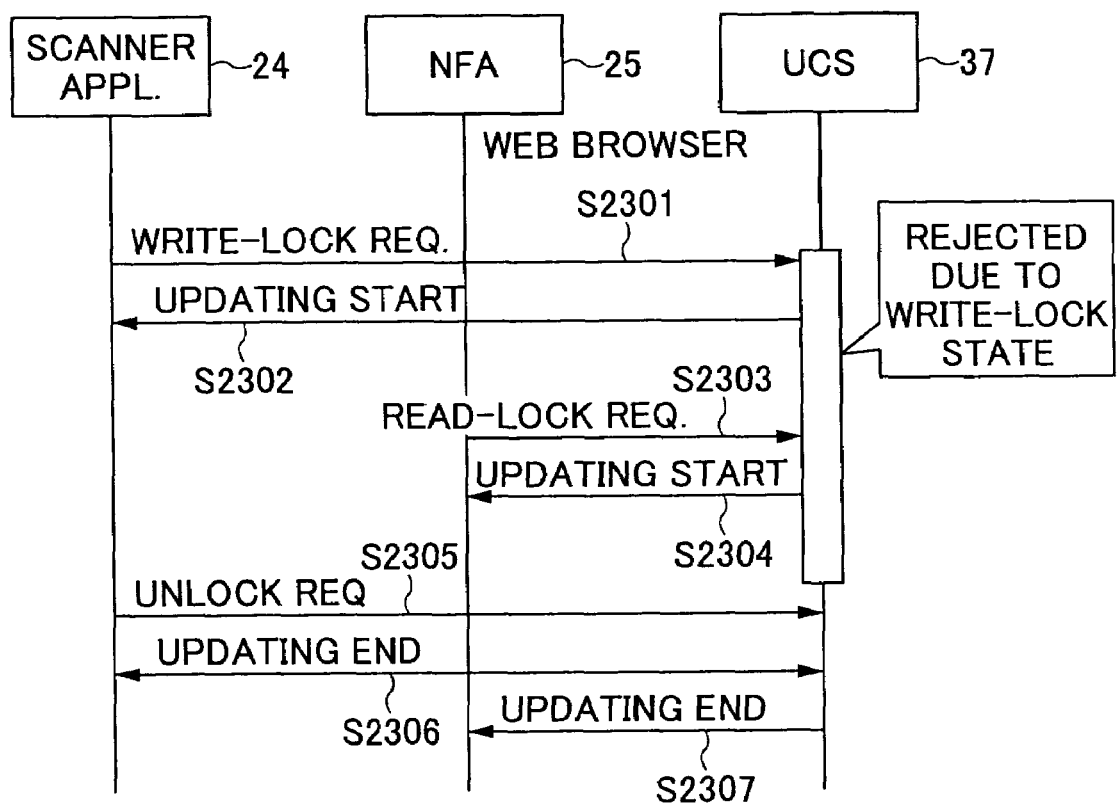
FIG. 23 is a sequence diagram for explaining another embodiment of the user information updating notice processing.

FIG. 23 is a sequence diagram for explaining another embodiment of the user information updating notice processing of the present invention.

At step S2301, the write lock request is sent from the scanner application 24 to the UCS 37.

At step S2302, the UCS 37 notifies the updating start of user information to the scanner application 24.

In addition, the UCS 37 does not notify the updating start of user information to the network file application 25. The network file application 25 is not provided to display the user information or the screen of FIG. 12 or FIG. 13 on the operation panel 70.

At step S2303, the acquisition request of user information occurs from the network device 331 etc., and the read lock request is sent from the network file application 25 to the UCS 37.

However, the write lock state of step S2301 is not unlocked at this time, and the read lock request of step S2303 is rejected.

Thus, if the read lock request is sent from the network file application 25 omitting the notice of the updating start of user information, the UCS 37 notifies at step S2304 to the network file application 25 that the notice of the updating start of user information is omitted, instead of notifying the user information state.

After the updating of user information is completed, the scanner application 24 sends the unlock request corresponding to step S2301 to the UCS 37 at step S2305.

At step S2306, the UCS 37 notifies the updating end of user information to the scanner application 24.

Moreover, at step S2307, the UCS 37 notifies the updating end of user information to the network file application 25.

After the updating end of user information is notified, the scanner application 24 and the network file application 25 will acquire user information.

In the user information updating notice processing of FIG. 23, the omitted notice of the updating start can be performed later, if needed.

Figure 24:
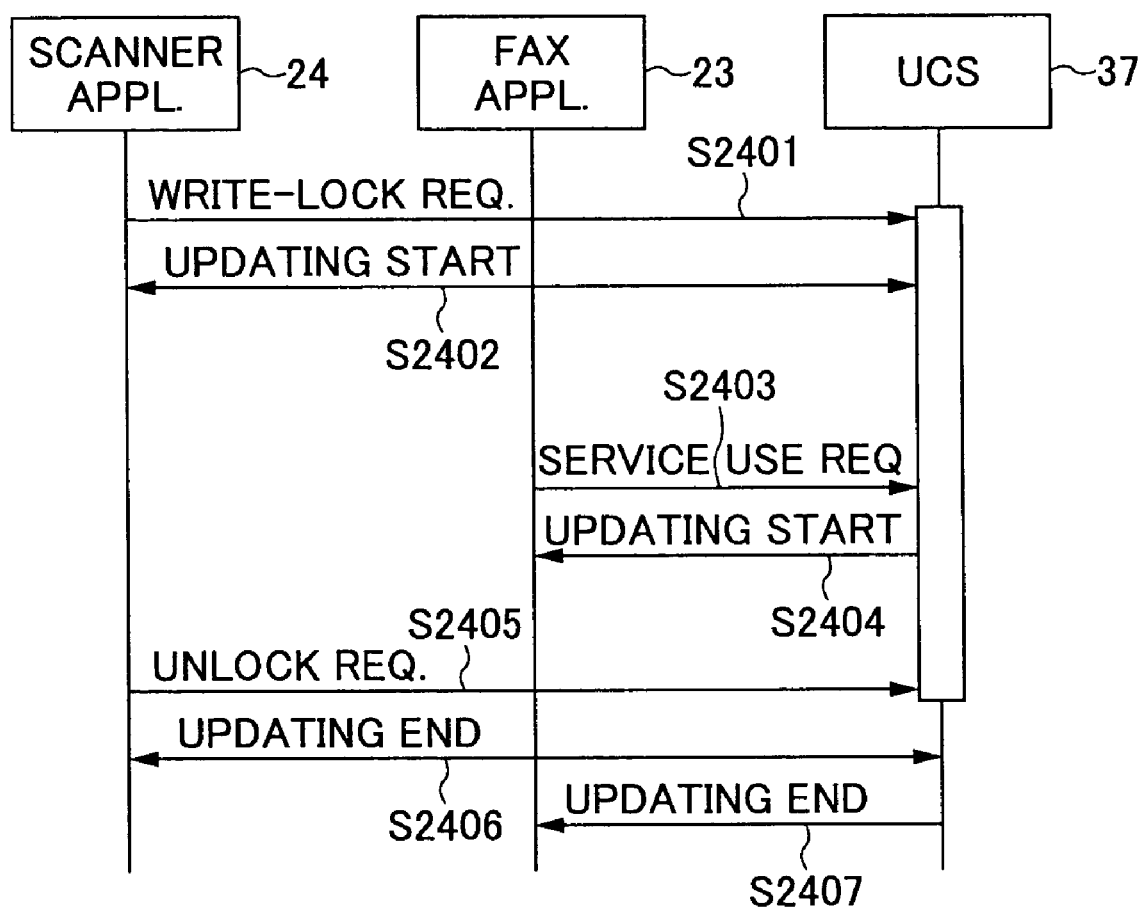
FIG. 24 is a sequence diagram for explaining another embodiment of the user information updating notice processing.

FIG. 24 is a sequence diagram for explaining another embodiment of the user information updating notice processing of the present invention.

At step S2401, the write lock request is sent from the scanner application 24 to the UCS 37.

At step S2402, the UCS 37 notifies the updating start of user information to the scanner application 24.

In the present embodiment, the fax application 23 does not sends the application use request to the UCS 37 at this time, and the updating start of user information is not notified to the fax application 23.

At step S2403, the fax application 23 sends the application use request to the UCS 37.

Thus, when the application use request is sent from the fax application 23 to the UCS 37 after the updating start of user information is notified, the UCS 37 notifies at step S2404 the updating start of user information to the fax application 23.

Therefore, the fax application 23 can recognize a possibility that user information will be updated.

After the updating of user information is completed, the scanner application 24 sends the unlock request corresponding to step S2401 to the UCS 37 at step S2405.

At step S2406, the UCS 37 notifies the updating end of user information to the scanner application 24.

Moreover, at step S2407, the UCS 37 notifies the updating end of user information to the fax application 23.

If the updating end of user information is notified, the fax application 23 and the scanner application 24 will acquire the updated user information.

In the user information updating notice processing of FIG. 24, the notice of the updating start which has been already performed can be performed later, if needed.

By the way, the fax application 23, the scanner application 24, etc. can also use the user information which is directly inputted by the operator, in addition to the user information acquired from the UCS 37.

For example, the operator can perform the direct inputting of the destination data, such as the e-mail address or the fax number, by operating the soft keyboard displayed on the operation panel 70, and can also choose the destination.

The user information which is directly inputted by the operator can be added to the user information which is stored in the HDD 68 by the UCS 37, and it can be managed by using the shortcut registration.

Usually, if the write lock request and the unlock request mentioned above are sent after the operator chooses the destination, the fax application 23, the scanner application 24, etc. will determine that the destination may have changed, and will cancel all the destinations chosen by the operator.

The operator is notified of the updating start and updating end of user information by displaying the screens of FIG. 12 and FIG. 13 on the operation panel 70.

However, since the destination cannot change even if the write lock request and the unlock request mentioned above are sent when the destination which the operator chose is the destination by which the direct input was carried out, the destination chosen by the operator will have been canceled vainly.

Therefore, when the destination which is chosen by the operator is the destination which is directly inputted by the operator, it is efficient not to cancel the destination vainly.

Next, a description will be given of the shortcut registration processing in which the destination is not canceled vainly when the destination which is chosen by the operator is the destination which is directly inputted by the operator.

Figure 25:
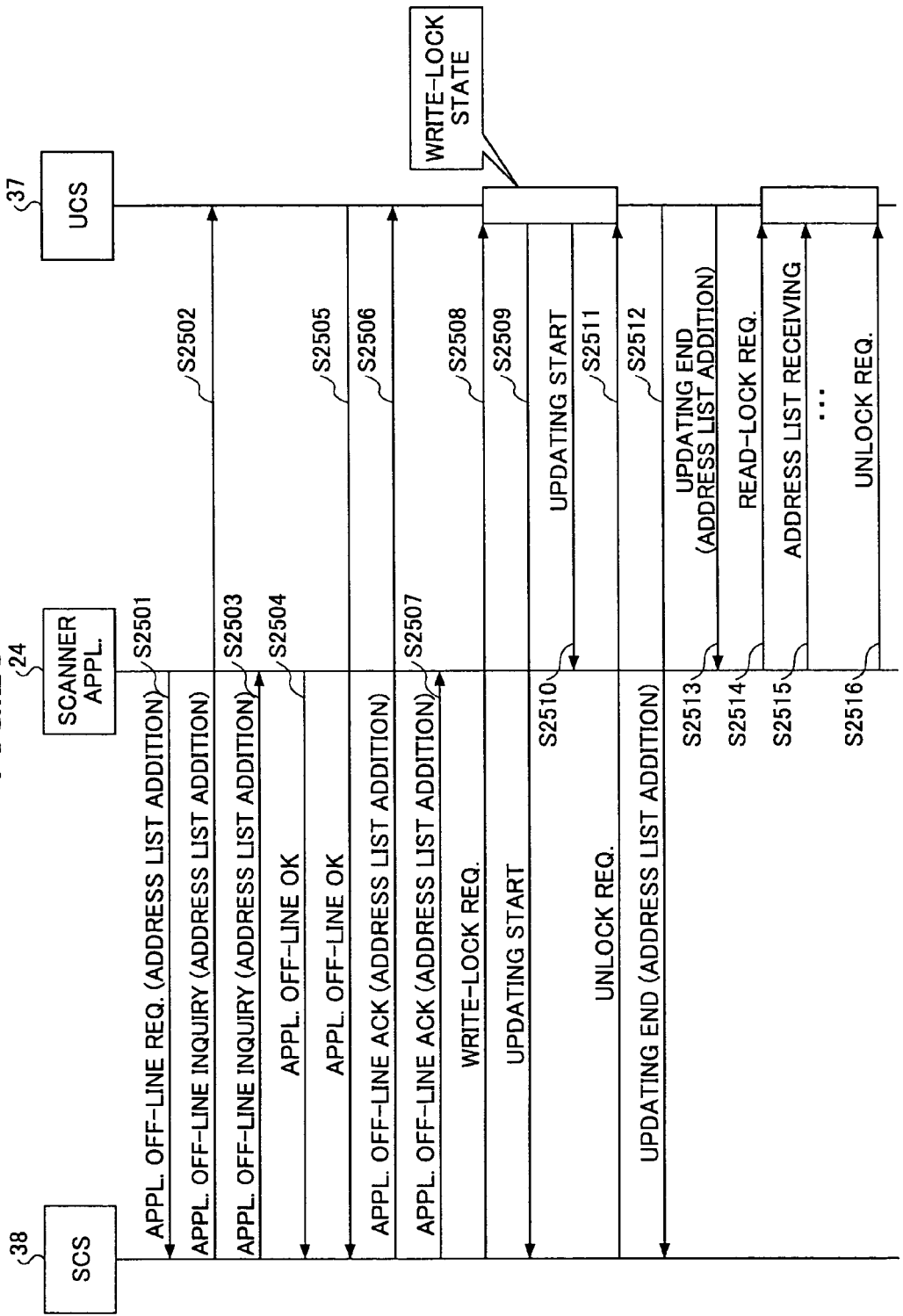
FIG. 25 is a sequence diagram for explaining an example of user information shortcut registration processing of the present invention.

FIG. 25 is a sequence diagram for explaining an example of the shortcut registration processing of user information according to the present invention.

At step S2501, based on the shortcut registration request from the operator, the application off-line request (for the address list addition) is sent from the scanner application 24 to the SCS 38.

When the application off-line request is received, the SCS 38 sends at step S2502 the application off-line inquiry (for the address list addition) to the UCS 37.

Moreover, the SCS 38 sends at step S2503 the application off-line inquiry (for the address list addition) to the scanner application 24.

At step S2504, the scanner application 24 sends to the SCS 38 the application off-line O.K.

Moreover, at step S2505, the UCS 37 sends to the SCS 38 the application off-line O.K.

When all the application off-line O.K. signals to the application off-line inquiry are received, the SCS 38 sends at step S2506 the application off-line acknowledgement (for the address list addition) to the UCS 37.

Moreover, the SCS 38 sends at step S2507 the application off-line acknowledgement (for the address list addition) to the scanner application 24.

After the application off-line acknowledgement is sent, the SCS 38 sends the write lock request to the UCS 37 at step S2508.

At step S2509, the UCS 37 notifies the updating start of user information to the SCS 38.

Moreover, at step S2510, the UCS 37 notifies the updating start of user information to the scanner application 24.

After the use and updating of user information are completed, the SCS 38 sends the unlock request corresponding to step S2508 to the UCS 37 at step S2511.

At step S2512, the UCS 37 notifies the updating end of user information to the SCS 38.

Moreover, at step S2513, the UCS 37 notifies the updating end of user information to the scanner application 24.

After the updating end of user information is notified, the scanner application 24 sends the read lock request to the UCS 37 at step S2514.

At step S2515, the scanner application 24 performs the acquisition of the address list again.

After the re-acquisition of the address list is completed, the scanner application 24 sends the unlock request corresponding to step S2514 to the UCS 37 at step S2516, and the shortcut registration processing of the user information is finished.

In the shortcut registration processing of FIG. 25, the destination is not vainly canceled when the destination selected by the operator is the destination which is directly inputted by the operator, and it is possible to avoid that the operator performs the direct input of the same destination repeatedly and chooses it. Thus, the resources of the multi-function system 1 can be saved by performing the shortcut registration processing of FIG. 25.

By the way, in the multi-function system 1, the access privilege of the document data based on the individuals or the groups is managed with the document access control list (the document ACL).

Usually, rechecking processing is performed in order to ensure that the document ACL reflects the changes of the user information when the user information is updated.

However, the document ACL is not influenced even when the names or the groups, etc. contained in the user information are updated. In the case of a conventional shared data management method, when the user information is updated, the unneeded rechecking processing is performed for the document ACL.

Therefore, when the contents of the updated user information do not affect the document ACL, omission of the rechecking processing of the document ACL is more efficient to save the resources of the multi-function system 1.

In the following, when the contents of the updated user information do not affect the document ACL, the shortcut registration processing in which the rechecking processing of the document ACL is not performed immediately will be described.

Figure 26:
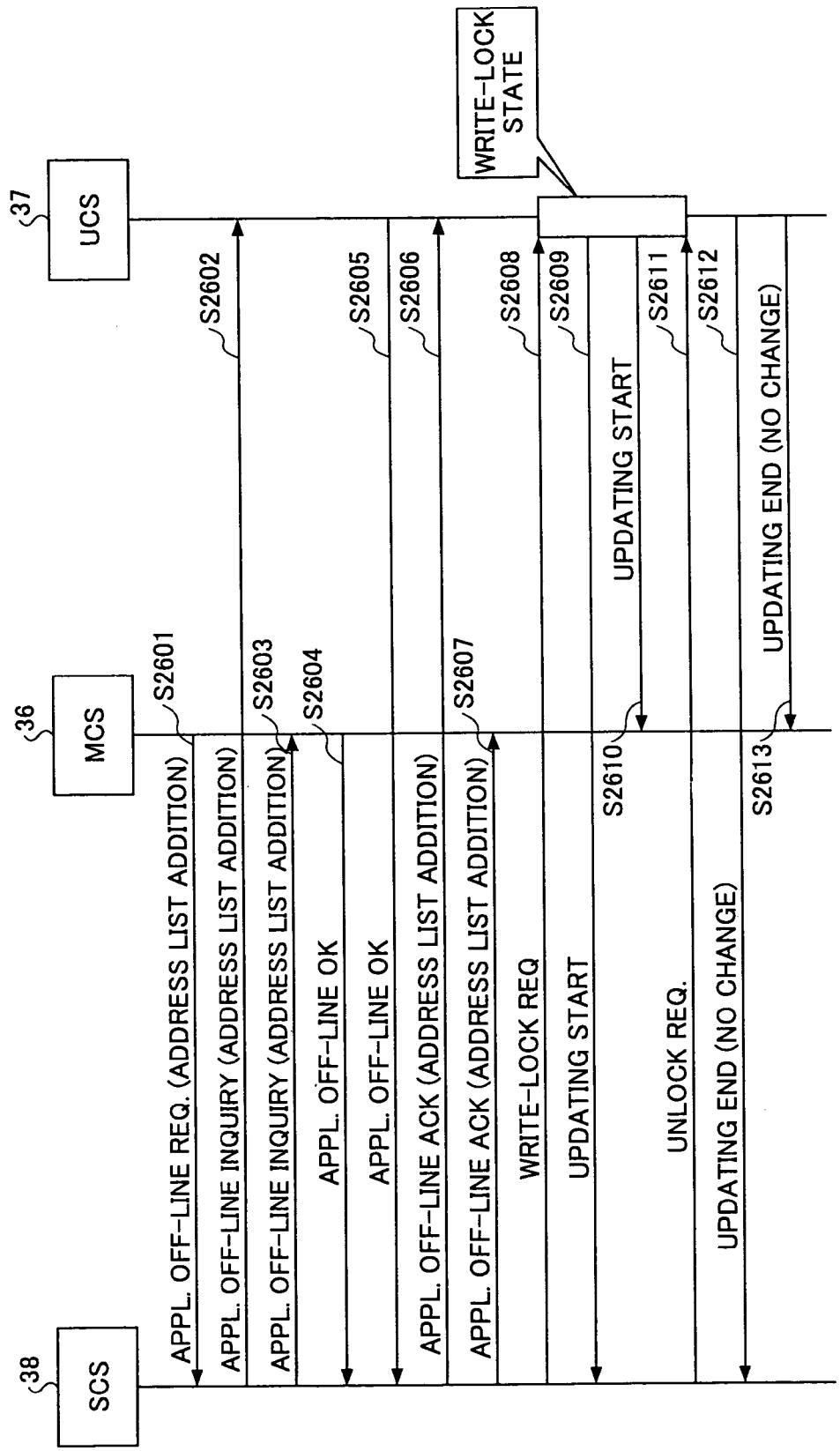
FIG. 26 is a sequence diagram for explaining another example of the user information shortcut registration processing.

FIG. 26 is a sequence diagram for explaining another example of the shortcut registration processing of user information according to the present invention.

At step S2601, based on the shortcut registration request from the operator, the application off-line request (for the address list addition) is sent from the MCS 36 to the SCS 38.

When the application off-line request is received, the SCS 38 sends at step S2602 the application off-line inquiry (for the address list addition) to the UCS 37.

Moreover, the SCS 38 sends at step S2603 the application off-line inquiry (for the address list addition) to the MCS 36.

At step S2604, the MCS 36 sends the application off-line O.K. to the SCS 38.

Moreover, at step S2605, the UCS 37 sends the application off-line O.K. to the SCS 38.

When all the application off-line O.K. signals to the application off-line inquiry are received, the SCS 38 sends at step S2606 the application off-line acknowledgement (for the address list addition) to the UCS 37.

Moreover, the SCS 38 sends at step S2607 the application off-line acknowledgement (for the address list addition) to the MCS 36.

After the application off-line acknowledgement is sent, the SCS 38 sends the write lock request to the UCS 37 at step S2608.

At step S2609, the UCS 37 notifies the updating start of user information to the SCS 38.

Moreover, the UCS 37 notifies at step S2610 the updating start of user information to the MCS 36. Then, the UCS 37 performs the updating of user information.

In the present embodiment, suppose that the updating of the user information is performed such that the number of members in the address list remains unchanged by the updating, as an example in which the contents of the updated user information do not affect the document ACL.

After the use and updating of user information are completed, the SCS 38 sends the unlock request corresponding to step S2608 to the UCS 37 at step S2611.

At step S2612, the UCS 37 notifies the updating end of user information to the SCS 38.

Moreover, at step S2613, the UCS 37 notifies the updating end of user information to the MCS 36.

In addition, additional information, indicating that there is no change in the number of members in the address list, is contained in the updating-end notification sent at steps S2612 and S2613 by the UCS 37, which is notified to the SCS 38 and the MCS 36.

Therefore, the MCS 36 which receives the notice of the updating end of step S2613 is able to determine that the contents of the updated user information do not affect the document ACL. It is possible for the MCS 36 to omit the unneeded rechecking processing of the document ACL.

According to the shortcut registration processing of FIG. 26, it is possible to save the resources of the multi-function system 1 by omitting the unneeded rechecking processing of the document ACL.

Next, a description will be given of the shortcut registration processing in which rechecking processing of the document ACL is performed immediately when the contents of the updated user information affect the document ACL.

Figure 27:
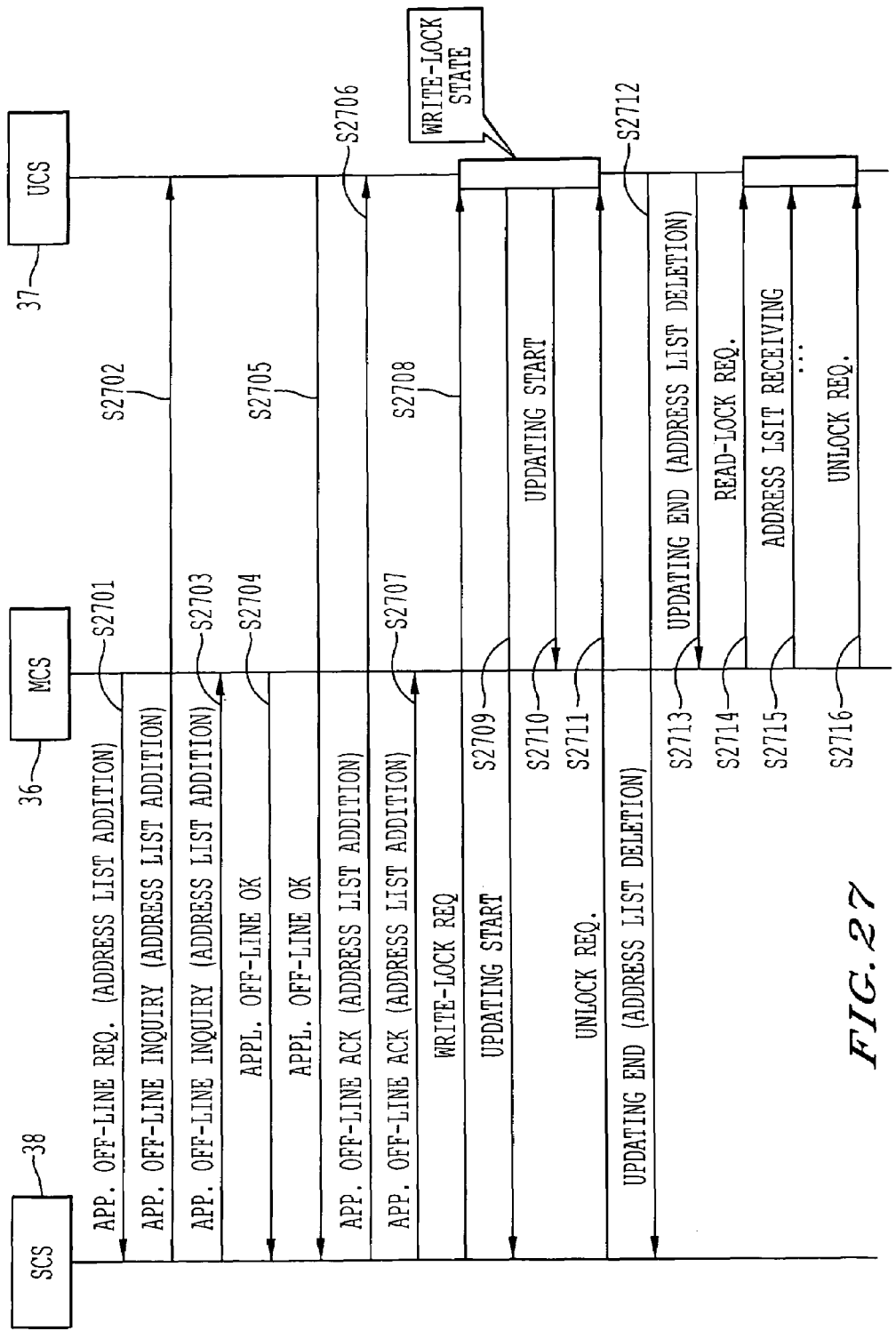
FIG. 27 is a sequence diagram for explaining another example of the user information shortcut registration processing.

FIG. 27 is a sequence diagram for explaining another embodiment of the shortcut registration processing of the user information according to the present invention.

The processing of steps S2701-S2707 of FIG. 27 is essentially the same as the processing of steps S2601-S2607 of FIG. 26, and a description thereof will be omitted.

After the application off-line acknowledgement is sent to the MCS 36 and the UCS 37, the SCS 38 sends the write lock request to the UCS 37 at step S2708.

The UCS 37 notifies at step S2709 the updating start of user information to the SCS 38.

Moreover, the UCS 37 notifies at step S2710 the updating start of user information to the MCS 36. Then, the UCS 37 carries out the updating of user information.

In the present embodiment, it is supposed that the updating of user information is performed such that the number of members of the address list is decreased, as an example in which the contents of the updated user information affect the document ACL.

After the use and updating of user information are completed, the SCS 38 sends the unlock request corresponding to step S2708 to the UCS 37 at step S2711.

At step S2712, the UCS 37 notifies the updating end of user information to the SCS 38.

Moreover, at step S2713, the UCS 37 notifies the updating end of user information to the MCS 36.

In the present embodiment, the information indicating "address list deletion", which results in the decrease of the number of members of the address list, is included in the notice of the updating end sent at steps S2712 and S2713.

After the notice of the updating end of step S2713 is received, the MCS 36 determines that the contents of the updated user information affect the document ACL, and starts the rechecking processing of the document ACL.

At step 52714, the MCS 36 sends the read lock request to the UCS 37.

At step S2715, the MCS 36 performs re-acquisition processing which receives the address list from the UCS 37.

After the re-acquisition of the address list is completed, the MCS 36 sends the unlock request corresponding to step S2714 to the UCS 37 at step S2716.

The MCS 36 performs rechecking processing of the document ACL based on the acquired address list.

In the shortcut registration processing of FIG. 27, when the contents of the updated user information affect the document ACL, the rechecking processing of the document ACL can be performed.

By the way, in the multi-function system 1, in order to decrease easily the power dissipation during the time the operator does not attend to work, the power-saving mode is provided to attain small power dissipation.

Usually, if the read lock request or the write lock request is sent after shifting to the power-saving mode, the multi-function system 1 performs lock control processing of the read lock request or the write lock request as follows.

Figure 28:
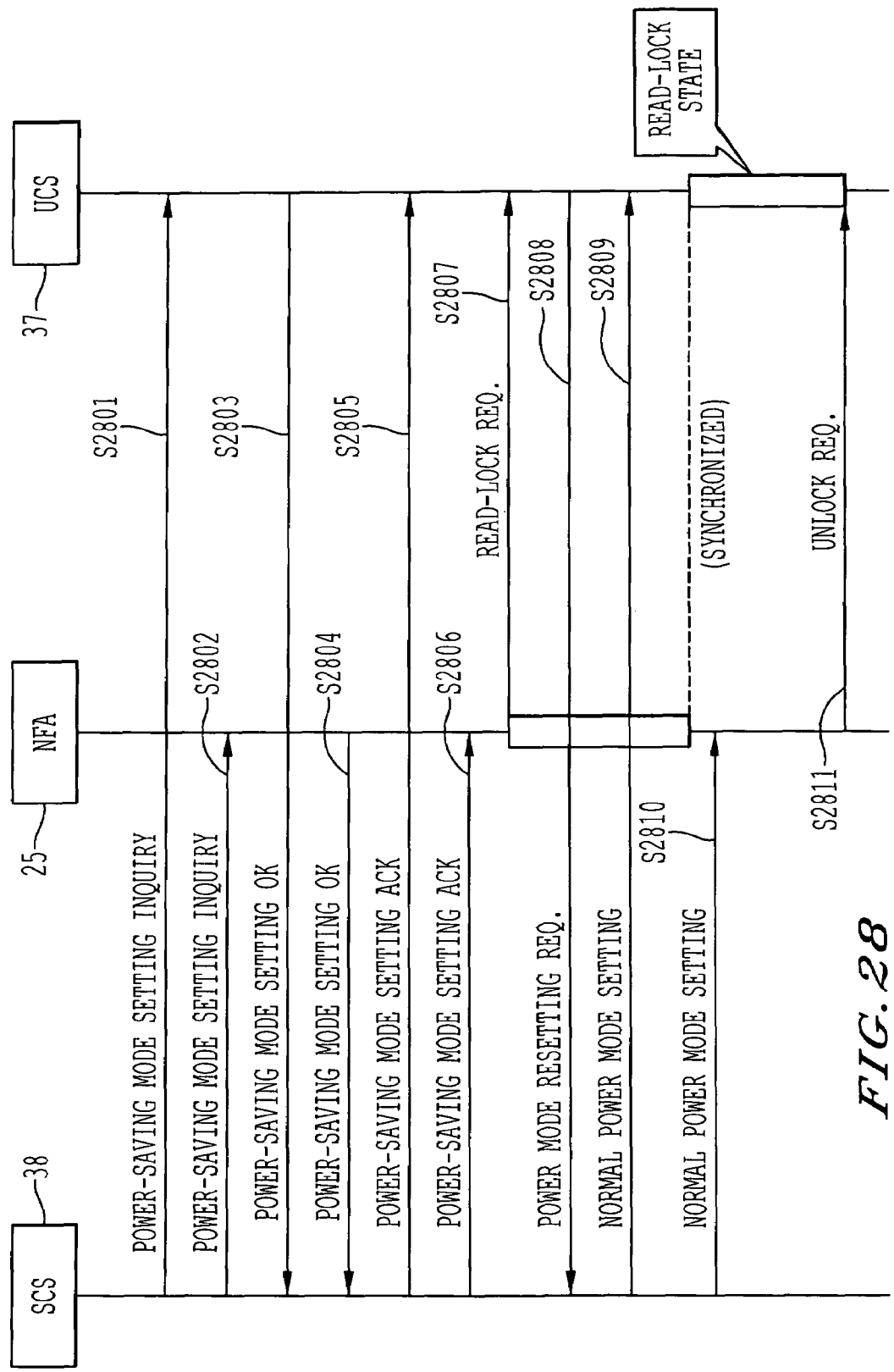
FIG. 28 is a sequence diagram for explaining an example of lock control processing at the time of power-saving mode.

FIG. 28 is a sequence diagram for explaining an example of the lock control processing at the time of power-saving mode.

At step S2801, the SCS 38 sends the power-saving mode setting inquiry to the UCS 37.

Moreover, the SCS 38 sends at step S2802 the power-saving mode setting inquiry to the NFA 25.

At step S2803, the UCS 37 notifies the power-saving mode setting O.K. to the SCS 38.

Moreover, at step S2804, the NF25 notifies the power-saving mode setting O.K. to the SCS 38.

When the power-saving mode setting O.K. in response to the power-saving mode setting inquiry is received, the SCS 38 notifies at step S2805 the power-saving mode setting acknowledgement to the UCS 37.

Moreover, the SCS 38 progresses to step S2806, and notifies the power-saving mode setting acknowledgement to NFA 25.

The multi-function system 1 shifts to the power-saving mode after processing of step S2806.

For example, when there is an access to the user information from the Web browser of the external network device 331 after shifting to the power-saving mode, the NFA 25 sends at step S2807 the read lock request to the UCS 37.

Because of the power-saving mode, the UCS 37 sends at step S2808 the power mode resetting request to the SCS 38.

When the power mode resetting request is received, the SCS 38 perform processing for resetting the power saving mode to the normal power mode.

The SCS 38 notifies at step S2809 the normal power mode setting to the UCS 37.

Moreover, the SCS 38 notifies at step S2810 the normal power mode setting to the NFA 25.

When the power mode of the multi-function system 1 is reset to the normal power mode, the necessary power is supplied to the HDD 68.

When the normal power mode setting is notified, the UCS 37 is synchronously set to the read-lock state as indicated by the dotted line in FIG. 28 and, the NFA 25 performs the acquisition of the required user information from the UCS 37.

After the acquisition of the required user information is completed, the NFA 25 sends the unlock request corresponding to step S2807 to the UCS 37 at step S2811.

In the example of FIG. 28, there is no problem in the lock control processing at the time of power-saving mode in any way. However, the problem arises in the example of FIG. 29.

Figure 29:
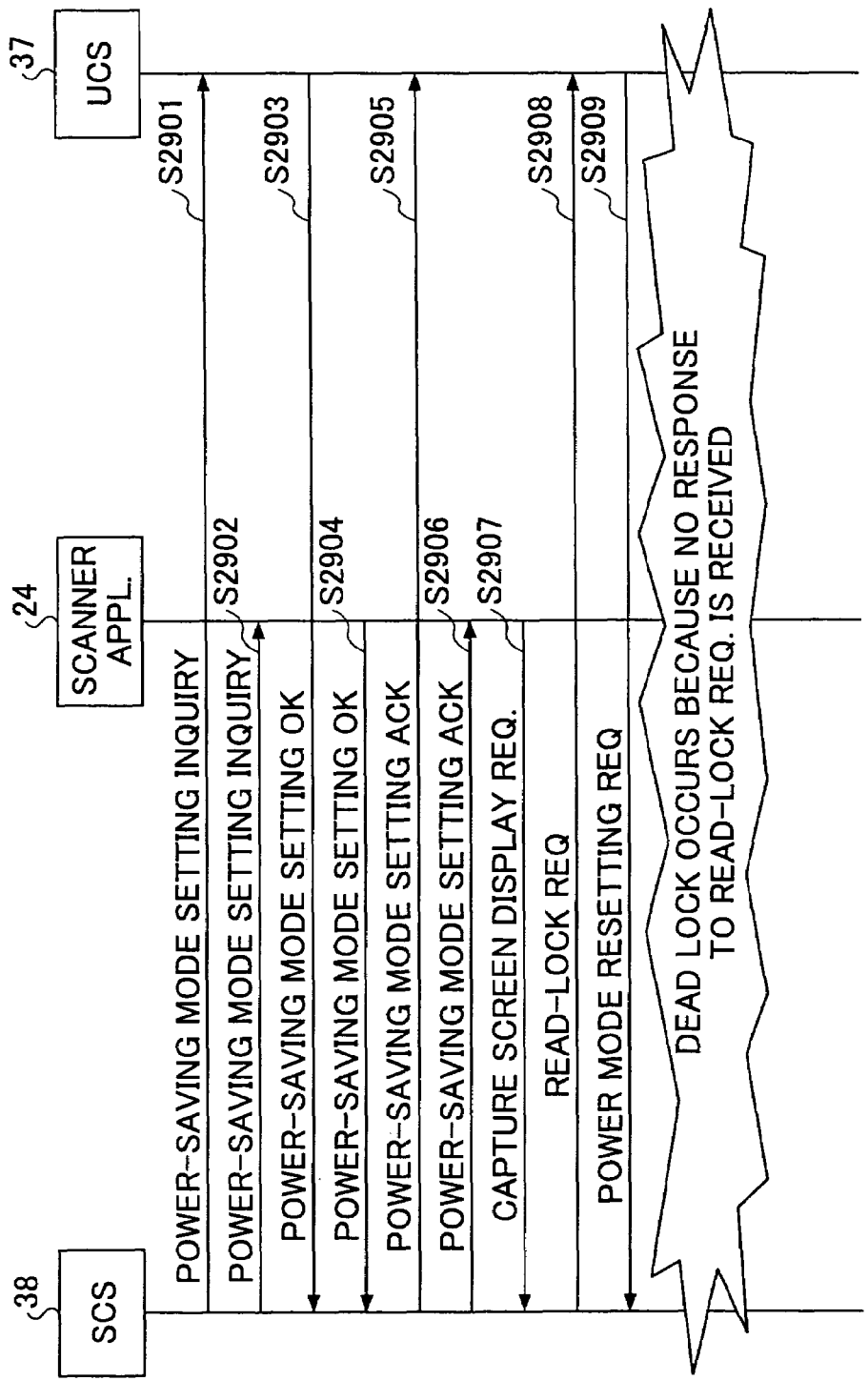
FIG. 29 is a sequence diagram for explaining the problem arising in the lock control processing at the time of power-saving mode.

FIG. 29 is a sequence diagram for explaining the problem arising in the lock control processing at the time of power-saving mode.

The processing of steps S2901-S2906 of FIG. 29 is essentially the same as the processing of steps S2801-S2806 of FIG. 28, and a description thereof will be omitted.

The multi-function system 1 shifts to the power-saving mode after the processing of step S2906.

When the capture screen for storing the document data is displayed after the shifting to the power-saving mode, the scanner application 24 sends the capture screen drawing request to the SCS 38 at step S2907.

When the capture screen drawing request is received, the SCS 38 sends at step S2908 the read lock request to the UCS 37.

Because of the shifting to the power-saving mode, the UCS 37 sends at step S2909 the power mode resetting request to the SCS 38.

However, the SCS 38 still does not receive the response corresponding to step S2908 even if it receives the power mode resetting request from the UCS 37 at step S2909, the SCS 38 does not perform processing for resetting the power mode.

If the request whose the SCS 38 needs the power mode resetting is required of other processes after shifting to the power-saving mode, the deadlock takes place by the power mode resetting request from other processes.

That is, the lock control processing at the time of the power-saving mode of FIG. 29 has the problem which causes the deadlock.

Therefore, it is necessary to cope with the deadlock in the lock control processing at the time of power-saving mode.

Figure 30:
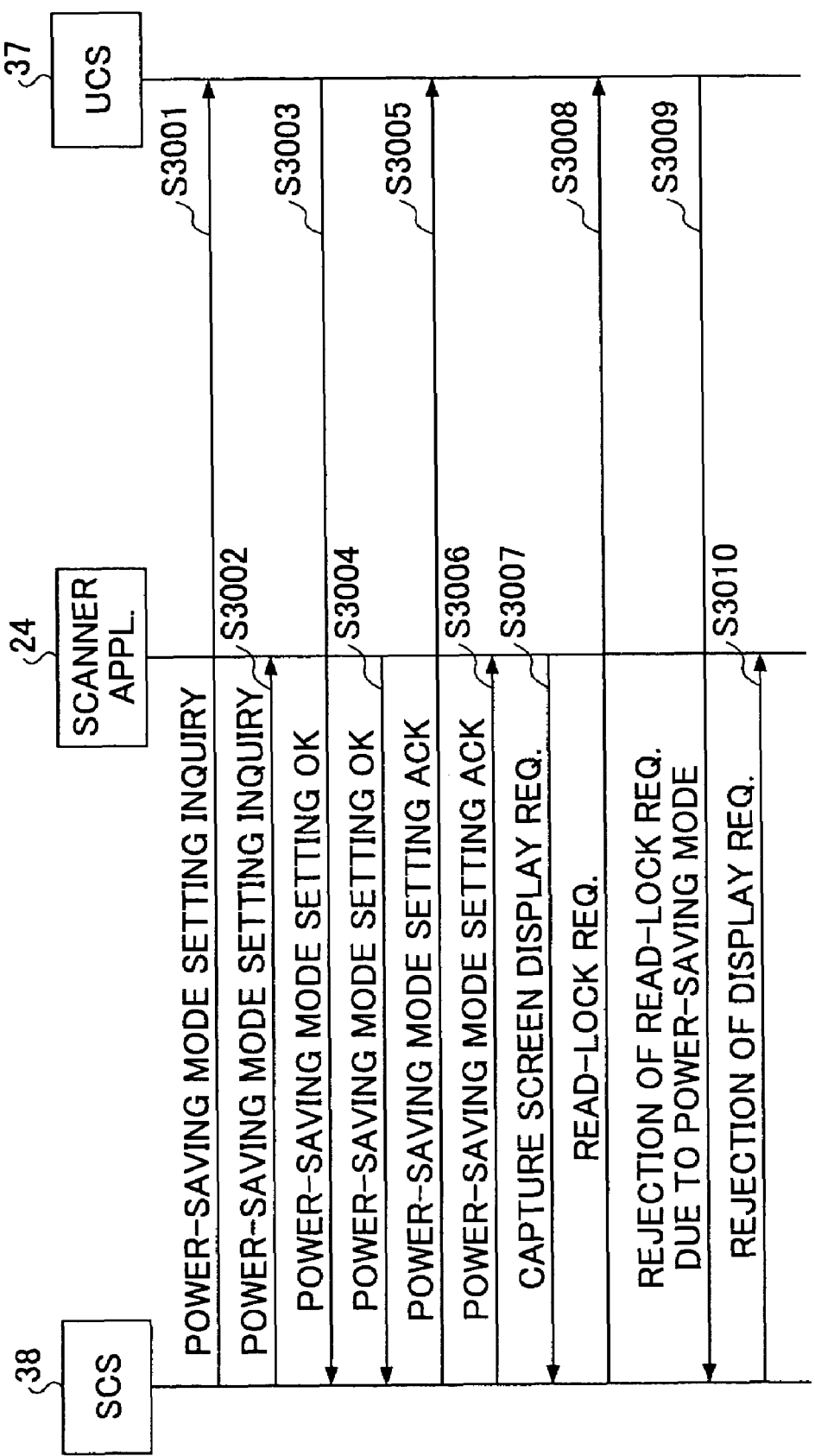
FIG. 30 is a sequence diagram for explaining an embodiment of lock control processing of the present invention at the time of power-saving mode.

FIG. 30 is a sequence diagram for explaining an embodiment of the lock control processing of the present invention at the time of the power-saving mode.

The processing of steps S3001-S3008 of FIG. 30 is essentially the same as the processing of steps S2901-S2808 of FIG. 29, and a description thereof will be omitted.

After the SCS 38 sends the read lock request to the UCS 37 at step S3008, the UCS 37 determines whether it shifts to the power-saving mode. The UCS 37 will not send the power mode resetting request to the SCS 38 in order to avoid the deadlock, when it is determined that it shifts to the power-saving mode.

At step S3009, the UCS 37 notifies the rejection of the received read lock request to the SCS 38 because of the power-saving mode.

Moreover, the SCS 38 notifies at step S3010 the rejection of the capture screen drawing request of step S2907 to the scanner application 24.

Although the illustration is given in FIG. 30, the SCS 38 can receive the capture screen drawing request from the scanner application 24 later without causing the deadlock by sending the read lock request of step S3008 to the UCS 37 after the power mode is reset to the normal power mode.

In the lock control processing at the time of the power-saving mode of FIG. 30, if the request whose the SCS 38 needs the return in power mode is required of other processes after shifting to the power-saving mode, the problem of the deadlock which is caused by the power mode resetting request from other processes can be resolved. Therefore, according the present embodiment, it is possible to save the resources of the multi-function system 1.

The present invention is not limited to the above-described embodiments, and variations and modifications may be made without departing from the scope of the present invention.

Further, the present invention is based on Japanese priority application No. 2002-275979, filed on Sep. 20, 2002, Japanese priority application No. 2002-275980, filed on Sep. 20, 2002, and Japanese priority application No. 2003-296580, filed on Aug. 20, 2003, the entire contents of which are hereby incorporated by reference.

What is claimed is:

1. An image forming apparatus, comprising:
   a display device;
   a plurality of hardware resources configured to carry out image formation;

a plurality of application programs performing respective processing of the plurality of application programs related to the image formation;

a storage device storing rewritable shared data which is used by the plurality of application programs in common; and a shared-data control unit selecting one or more of the plurality of application programs as destinations of updating-start notification and notifying a start of updating of the shared data to the selected one or more application programs when acquisition and updating of the shared data is inhibited in response to a write-lock request received from one of the plurality of application programs, and the shared-data control unit notifying an end of the updating of the shared data to the selected application programs when the acquisition and updating of the shared data is allowed in response to an unlock request received from said one of the plurality of application programs, wherein the plurality of application programs include a first application program that is currently subject to updating of the shared data by the shared-data control unit and configured to display the shared data on the display device, a second application program that is not currently subject to updating of the shared data by the shared-data control unit and configured to display the shared data on the display device when acquisition of the shared data is not inhibited, and a third application program that is configured to not display the shared data on the display device, when updating of the shared data of the first application program is performed by the shared data control unit, an updating-start notification is sent to the second application program by the shared data control unit and no updating-start notification is sent to the third application program by the shared data control unit, and one of a screen of the shared data of the first application program and a screen of the shared data of the second application program is selectively displayed on the display device.

2. The image forming apparatus according to claim 1 wherein the displaying device is an operation panel configured to display operational messages to an operator and receive input operational commands from the operator.

3. The image forming apparatus according to claim 1 wherein the shared-data control unit selects as the destinations of updating-start notification at least one of the plurality of application programs configured not to read out the shared data from the storing device upon starting of the image forming apparatus.

4. The image forming apparatus according to claim 1 wherein, when acquisition and updating of the shared data is inhibited and a read-lock request is received from one of the plurality of application programs to which a start of the updating of the shared data is not yet notified, the shared data-control unit notifies the start of the updating of the shared data to said one of the plurality of application programs and rejects acquisition of the shared data in response to the received read-lock request.

5. The image forming apparatus according to claim 1 wherein, when acquisition and updating of the shared data is inhibited and an application use request is received from one of the plurality of application programs to which a start of the updating of the shared data is not yet notified, the shared data control unit notifies the start of the updating of the shared data to said one of the plurality of application programs.

6. The image forming apparatus according to claim 1 wherein, after the end of the updating of the shared data is notified to the selected application programs, the shared-data control unit inhibits updating of the shared data in response to a read-lock request received from any of the selected application programs to which the end of the updating of the shared data is notified.

7. The image forming apparatus according to claim 1 wherein the shared-data control unit is configured to include additional information, indicating that the updating of the shared data is not performed, in the updating-end notification which notifies the end of the updating of the shared data to the selected application programs.

8. The image forming apparatus according to claim 1 wherein the shared-data control unit is configured to receive at least one of an acquisition start request, an acquisition end request, an updating start request and an updating end request from an external network device.

9. The image forming apparatus according to claim 1 wherein the shared data comprises destination address data which is used by the plurality of application programs in common.

10. The image forming apparatus according to claim 1 wherein the plurality of application programs include at least one of a scanner application program and a fax application program which use the shared data.

* * * * *